United States Patent [19]
Hara et al.

[11] Patent Number: 5,033,100
[45] Date of Patent: Jul. 16, 1991

[54] METHOD AND APPARATUS FOR CLASSIFYING PICTURE ELEMENTS IN RADIATION IMAGES

[75] Inventors: Shoji Hara; Wataru Ito, both of Kanagawa, Japan

[73] Assignee: Fuji Photo Film Co., Ltd., Kanagawa, Japan

[21] Appl. No.: 542,487

[22] Filed: Jun. 22, 1990

[30] Foreign Application Priority Data

Jun. 26, 1989 [JP] Japan .................... 1-162904
Jun. 26, 1989 [JP] Japan .................... 1-162905
Jun. 26, 1989 [JP] Japan .................... 1-162909
Apr. 4, 1990 [JP] Japan .................... 2-89368

[51] Int. Cl.$^5$ .............................. G06K 9/46
[52] U.S. Cl. ............................. 382/25; 382/6
[58] Field of Search ................. 382/6, 25, 41; 364/413.13

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,769,850 | 9/1988 | Itoh et al. | 382/25 |

FOREIGN PATENT DOCUMENTS 56-11395 2/1981 Japan .
61-5193 2/1986 Japan .

*Primary Examiner*—Stephen Brinich
*Attorney, Agent, or Firm*—Sughrue, Mion, Zinn, Macpeak & Seas

[57] ABSTRACT

Calculations are made to find the differences, $\Delta ij = fij - f0$, between the value of an image signal component f0 representing as picture element P0 in a radiation image and the values of image signal components fij representing the picture elements Pij, which are located on each of a plurality of lines Li, where $i = 1, 2, \ldots, n$, extending from the picture element P0 to the peripheral parts of the radiation image, and which are spaced a plurality of distances rij, where $j = 1, 2, \ldots, m$, from the picture element P0. A representative value, which is representative of the differences $\Delta ij$, is then found for each of the lines Li. A mean-level value of two representative values for each set of two lines, which extend from the picture element P0 in approximately opposite directions, is then calculated. From the mean-level values, which have been calculated for a plurality of the sets of lines, a judgment is made as to whether the picture element P0 falls or does not fall within the region corresponding to a circular pattern in the radiation image.

84 Claims, 8 Drawing Sheets

METHOD AND APPARATUS FOR CLASSIFYING PICTURE ELEMENTS IN RADIATION IMAGES

BACKGROUND OF THE INVENTION

1. Field of the Invention

This invention relates to a method for classifying picture elements in a radiation image into those belonging to a certain image pattern and those not belonging to a certain image pattern and an apparatus for carrying out the method. This invention particularly relates to a method and apparatus for classifying picture elements such that, from an image signal representing a radiation image of an object, a judgment can be made as to whether a predetermined picture element P0 in the radiation image falls or does not fall within the region corresponding to a predetermined pattern in the radiation image.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT.

Recently, in the radiation image recording and reproducing systems which use X-ray film or stimulable phosphor sheets, particularly in such radiation image recording and reproducing systems designed to facilitate medical diagnoses, not only have image signals been produced in ways which ensure that the visible images produced from them will be of high quality, but image signals have also been processed in ways which allow certain image patterns to be extracted from radiation images. One type of processing which results in the extraction of an image pattern is disclosed in, for example, U.S. Pat. No. 4,769,850.

Specifically, an image pattern can be detected in a complicated radiation image by processing the image signal representing it in various ways. The image signal is made up of a series of image signal components, and with appropriate processing the image signal components corresponding to a particular image pattern can be found. For example, from a very complicated radiation image, such as an X-ray image of the chest of a human body, which includes various linear and circular patterns, an approximately circular image corresponding to a tumor, or the like, can be detected.

After a pattern, for example, a tumor image, is detected in a complicated radiation image, such as an X-ray image of the chest of a human body, a visible image is reproduced and displayed such that the detected pattern can be viewed clearly. Such a visible image can serve as an effective tool in, particularly, the efficient and accurate diagnosis of an illness.

U.S. Pat. No. 4,769,850 discloses a method for finding a circular pattern, wherein an image signal representing an X-ray image of the chest of a human body, or the like, is processed with a spatial-domain filter composed of three concentric circles.

However, radiation images of human bodies have very complicated configurations. For example, the sizes of tumor images in X-ray images of chests are multifarious. Also, the shapes of some tumor images are not circular, but may be, for example, approximately elliptic. With the method for finding a circular pattern, wherein a spatial-domain filter composed of three concentric circles is utilized, tumor images cannot be detected accurately in cases where several tumor images having different sizes are present together or in cases where the shape of a tumor image is not circular. After an image pattern is detected and a visible image showing the detected image pattern is reproduced in, for example, a radiation image recording and reproducing system designed to facilitate medical diagnoses, a physician will base his diagnosis primarily on how the detected pattern looks. If a certain pattern (a certain tumor image) is not detected accurately, a physician may fail to find a tumor. This is a very serious problem.

SUMMARY OF THE INVENTION

The primary object of the present invention is to provide a method and apparatus for determining whether a picture element is in a circular pattern even if several circular patterns having different sizes are present in a radiation image and even if the shapes of the circular patterns deviate slightly from circles, with the judgment being made accurately as to whether a predetermined picture element P0 in the radiation image falls or does not fall within the region corresponding to a particular circular pattern in the radiation image.

Another object of the present invention is to provide a method and apparatus for classifying picture elements as belonging to or not belonging to a circular pattern wherein an accurate judgment is made as to whether a predetermined picture element P0 in a radiation image falls or does not fall within the region corresponding to a circular pattern in the radiation image, with the judgment being based on the shape of the circular pattern, instead of being based on the level of contrast of the circular pattern with the surrounding image areas.

A further object of the present invention is to provide a method and apparatus for classifying picture elements wherein a circular pattern and a linear pattern, which may be present in a radiation image, can be accurately discriminated from each other with a single filter, and a judgment can be made accurately as to whether a predetermined picture element P0 in the radiation image falls or does not fall within the region corresponding to a circular pattern in the radiation image.

A still further object of the present invention is to provide a method and apparatus for classifying picture elements wherein the adverse effects from noise in a radiation image are eliminated, and the contour of a predetermined pattern in the radiation image, which pattern is to be found, can be detected accurately.

The present invention provides a first method for classifying picture elements as belonging or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:

(i) calculating the differences, $\Delta ij = fij - f0$, between the value of an image signal component f0 representing a predetermined picture element P0 and the values of image signal components fij representing the picture elements Pij, which are located on each of a plurality of lines Li, where $i = 1, 2, \ldots, n$, extending from said predetermined picture element P0 to peripheral parts of said radiation image, and which are spaced a plurality of predetermined distances rij, where $j = 1, 2, \ldots, m$, from said predetermined picture element P0, (ii) finding a representative value, which is representative of said differences $\Delta ij$, for each of said lines Li, (iii) calculating a mean-level value of two said representative values for each set of two said lines which extend from said predetermined picture element P0 in approximately opposite directions, and (iv) from the mean-level values, which have been calculated for a plurality of said sets of lines, judging whether said predetermined picture element P0 falls or does not fall within the region corresponding to said circular pattern.

The present invention also provides a first apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a difference calculating means for calculating the differences, $\Delta ij = fij - f0$, between the value of an image signal component f0 representing a predetermined picture element P0 and the values of image signal components fij representing the picture elements Pij, which are located on each of a plurality of lines Li, where $i = 1, 2, \ldots, n$, extending from said predetermined picture element P0 to peripheral parts of said radiation image, and which are spaced a plurality of predetermined distances rij, where $j = 1, 2, \ldots, m$, from said predetermined picture element P0, (ii) a representative value calculating means for finding a representative value, which is representative of said differences $\Delta ij$, for each of said lines Li, (iii) a mean calculating means for calculating a mean-level value of two said representative values for each set of two said lines which extend from said predetermined picture element P0 in approximately opposite directions, and (iv) a judgment means for judging, from the mean-level values, which have been calculated for a plurality of said sets of lines, whether said predetermined picture element P0 falls or does not fall within the region corresponding to said circular pattern.

In the first method and apparatus for classifying picture elements as belonging or not belonging to a circular pattern in accordance with the present invention, the number of lines Li, where $i = 1, 2, \ldots, n$, i.e. the value of n, is not limited to a specific value, but may take any value which will satisfy the level of accuracy required of the judgment, which will allow the operations to be completed within a specified time, or the like.

Also, the number of predetermined distances rij, where $j = 1, 2, \ldots, m$, i.e. the value of m, is not limited to a specific value.

The term "representative value" as used herein for the first method and apparatus for classifying picture elements in accordance with the present invention means a value which is suitable for expressing the presence or absence or amount of the differences $\Delta ij$ between the value of the image signal component f0 representing the predetermined picture element P0 and the values of the image signal components fij representing the picture elements Pij, which are located on each of a plurality of lines Li extending from the predetermined picture element P0 to peripheral parts of the radiation image, and which are spaced a plurality of predetermined distances rij from the predetermined picture element P0. By way of example, in cases where, typically, the circular pattern has the characteristic that the value of the image signal component corresponding to the center positions of the circular pattern is smaller than the values of the image signal components corresponding to the peripheral portions of the circular pattern, the maximum value of the differences $\Delta ij$ may be employed as the representative value. In cases where the circular pattern has the characteristic that the value of the image signal component corresponding to the center position of the circular pattern is larger than the values of the image signal components corresponding to the peripheral portions of the circular pattern, the minimum value of the differences $\Delta ij$ may be employed as the representative value. However, in cases where the maximum value of the differences $\Delta ij$ is employed as the representative value, if, for example, all of the differences $\Delta ij$ between the value of the image signal component f0 representing the predetermined picture element P0 and the values of the image signal components fij representing the picture elements Pij, which are located on a certain line Lk among a plurality of the lines Li extending from the predetermined picture element P0 to peripheral parts of the radiation image, and which are spaced a plurality of predetermined distances rij from the predetermined picture element P0, are negative, no effective maximum value of the differences $\Delta ij$ can be found for the line Lk. In such cases, a maximum value of the differences $\Delta ij$ may be found from some extra simple calculations and then employed as the representative value. Alternatively, for example, a value of 0.0 may be employed as the representative value. Accordingly, the term "representative value" as used herein for the first method and apparatus for classifying picture elements in accordance with the present invention can also mean a value employed in lieu of a representative value in cases where a representative value is obtained, which does not effectively represent the differences between the value of the image signal component f0 representing the picture element P0 located at the center position of a circular pattern and the values of the image signal components fij representing the picture elements Pij located at peripheral portions of the circular pattern. The term "representative value" as used herein for the first method and apparatus for classifying picture elements in accordance with the present invention further means a value which substantially represents the maximum value or the minimum value of the differences $\Delta ij$, for example, a value calculated from a formula expressed as (maximum value)−(predetermined value) or (minimum value)+(predetermined value).

In the first method and apparatus for classifying picture elements in accordance with the present invention, the differences are calculated from a formula expressed as $\Delta ij = fij - f0$. Such embodiments are substantially identical with embodiments wherein the differences are calculated from a formula expressed as $\Delta ij' = f0 - fij$, except that the maximum values and the minimum values of the differences are reversed. The first method and apparatus for classifying picture elements in accordance with the present invention are meant to embrace within their scopes embodiments which are substantially identical.

The term "mean-level value" as used herein for the first method and apparatus for classifying picture elements as belonging to or not belonging to a circular pattern in accordance with the present invention means a value which is suitable for expressing the presence or absence or amount of the differences between the value of the image signal component f0 representing the picture element P0 located at the center position of the circular pattern and the two representative values found for each set of two lines, which extend from the picture element P0 in approximately opposite directions. By way of example, the mean-level value may be the arithmetical mean or the geometric mean of the two representative values. Alternatively, the two representative values may be weighted, and the mean value of the weighted representative values may be employed as the mean-level value.

With the first method and apparatus for classifying picture elements in accordance with the present invention, the differences, $\Delta ij = fij - f0$, are found between the value of an image signal component f0 representing a predetermined picture element P0 and the values of the image signal components fij representing the picture elements Pij. The picture elements Pij are located on each of a plurality of lines Li, where $i = 1, 2, \ldots, n$, extending from the predetermined picture element P0 to peripheral parts of the radiation image, and are spaced a plurality of predetermined distances rij, where $j = 1, 2, \ldots, m$, from the predetermined picture element P0. Thereafter, a representative value, which is representative of the differences $\Delta ij$, is found for each of the lines Li. Therefore, even when circular patterns having different sizes are present in a radiation image and even when the shapes of the circular patterns deviate slightly from circles, for example, are elliptic, a judgment can be made accurately as to whether the predetermined picture element P0 falls or does not fall within the region corresponding to a circular pattern. Also, with the first method and apparatus for classifying picture elements in accordance with the present invention, a representative value, which is representative of the differences $\Delta ij$, is found for each of the lines Li, and a calculation is made to find a mean-level value of two representative values for each set of two lines which extend from the predetermined picture element P0 in approximately opposite directions. Thereafter, from the mean-level values, which have been calculated for a plurality of the sets of lines, a judgment is made as to whether the predetermined picture element P0 falls or does not fall within the region corresponding to the circular pattern. Accordingly, even when the circular pattern is present in a region of a radiation image where the background image density changes sharply, for example, even when a tumor image is present in the vicinity of a rib image in an X-ray image of the chest of a human body, a judgment can be made accurately as to whether the predetermined picture element P0 falls or does not fall within the region corresponding to the circular pattern.

With the first method and apparatus for classifying picture elements in accordance with the present invention, a judgment is made as to whether a predetermined picture element P0 in a radiation image falls or does not fall within the region corresponding to a circular pattern. If the judgment operation is repeated for all the image signal components representing the radiation image, i.e. if each of the image signal components is processed with the filter in accordance with the present invention, it is possible to detect the circular pattern in the radiation image.

The present invention further provides a second method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:

(i) calculating the gradients $\nabla fi$ of image signal components $fi$ representing the picture elements $Pi$, which are located on a plurality of lines $Li$, where $i = 1, 2, \ldots, n$, extending from a predetermined picture element $P0$ to peripheral parts of said radiation image, and which are spaced a predetermined distance $ri$ from said predetermined picture element $P0$, (ii) calculating the normalized gradients $\nabla fi/|\nabla fi|$ by dividing the gradients $\nabla fi$ by their magnitudes $|\nabla fi|$, (iii) calculating the projections of said normalized gradients $\nabla fi/|\nabla fi|$ on the vectors directed from said picture elements $Pi$ to said predetermined picture element $P0$, the projections being expressed as $\nabla fi/|\nabla fi| *ei$, where $ei$ denotes the unit vectors directed from said picture elements $Pi$ to said predetermined picture element $P0$, and * denotes the inner product, (iv) calculating a mean-level value from the values of said projections $\nabla fi/|\nabla fi|*ei$, and (v) from said mean-level value, judging whether said predetermined picture element $P0$ falls or does not fall within the region corresponding to said circular pattern.

The second method for classifying picture elements in accordance with the present invention may be modified such that it utilizes image signal components $fij$ representing the picture elements $Pij$, which are located on each of a plurality of lines $Li$, where $i = 1, 2, \ldots, n$, extending from the predetermined picture element $P0$ to peripheral parts of the radiation image, and which are spaced a plurality of predetermined distances $rij$, where $j = 1, 2, \ldots, m$, from the predetermined picture element $P0$.

Specifically, the present invention still further provides a third method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:

(i) calculating the gradients $\nabla fij$ of image signal components $fij$ representing the picture elements $Pij$, which are located on each of a plurality of lines $Li$, where $i = 1, 2, \ldots, n$, extending from a predetermined picture element $P0$ to peripheral parts of said radiation image, and which are spaced a plurality of predetermined distances $rij$, where $j = 1, 2, \ldots, m$, from said predetermined picture element $P0$, (ii) calculating the normalized gradients $\nabla fij/|\nabla fij|$ by dividing the gradients $\nabla fij$ by their magnitudes $|\nabla fij|$, (iii) calculating the projections of said normalized gradients $\nabla fij/|\nabla fij|$ on vectors which are directed from said picture elements $Pij$ to said predetermined picture element $P0$ the projections being expressed as $\nabla fij/|\nabla fij|*ei$, where $ei$ denotes the unit vectors directed from said picture elements $Pij$ to said predetermined picture element $P0$, and * denotes the inner product, (iv) finding a representative value $\{\nabla fij/|\nabla fij|*ei\}r$, which is representative of said projections $\nabla fij/|\nabla fij|*ei$, for each of said lines $Li$, (v) calculating a mean-level value of said representative values $\{\nabla fij/|\nabla fij|*ei\}r$, which have been found for the plurality of said lines $Li$, and (vi) from said mean-level value, judging whether said predetermined picture element $P0$ falls or does not fall within the region corresponding to said circular pattern.

The present invention also provides a second apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a gradient calculating means for calculating the gradients $\nabla fi$ of image signal components $fi$ representing the picture elements $Pi$, which are located on a plurality of lines $Li$, where $i = 1, 2, \ldots, n$, extending from a predetermined picture element $P0$ to the peripheral parts of said radiation image, and which are spaced a predetermined distance $ri$ from said predetermined picture element $P0$, (ii) a normalization means for calculating the normalized gradients $\nabla fi/|\nabla fi|$ by dividing the gradients $\nabla fi$ by their magnitudes $|\nabla fi|$, (iii) an inner product calculating means for calculating the projections of said normalized gradients $\nabla fi/|\nabla fi|$ on vectors which are directed from said picture elements $Pi$ to said predetermined picture element $P0$ the projections being expressed as $\nabla fi/|\nabla fi|*ei$, where $ei$ denotes the unit vectors directed from said picture elements $Pi$ to said predetermined picture element $P0$, and * denotes the inner product, (iv) a mean calculating means for calculating a mean-level value of said projections $\nabla fi/|\nabla fi|*ei$, and (v) a judgment means for judging, from said mean-level value, whether said predetermined picture element $P0$ falls or does not fall within the region corresponding to said circular pattern.

Like the second method for classifying picture elements in accordance with the present invention, the second apparatus therefor may be modified such that it utilizes image signal components $fij$ representing the picture elements $Pij$, which are located on each of a plurality of lines $Li$, where $i = 1, 2, \ldots, n$, extending from a predetermined picture element $P0$ to peripheral parts of the radiation image, and which are spaced a plurality of predetermined distances $rij$, where $j = 1, 2, \ldots, m$, from the predetermined picture element $P0$.

Specifically, the present invention further provides a third apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a gradient calculating means for calculating the gradients $\nabla fij$ or image signal components fij representing the picture elements Pij, which are located on each of a plurality of lines Li, where $i=1, 2, \ldots, n$, extending from a predetermined picture element P0 to peripheral parts of said radiation image, and which are spaced a plurality of predetermined distances rij, where $j=1, 2, \ldots, m$, from said predetermined picture element P0, (ii) a normalization means for calculating the normalized gradients $\nabla fij/|fij|$ by dividing the gradients $\nabla fij$ by their magnitudes $|\nabla fij|$, (iii) an inner product calculating means for calculating the projections of said normalized gradients $\nabla fij/|\nabla fij|$ on vectors which are directed from said picture elements Pij to said predetermined picture element P0, the projections being expressed as $\nabla fij/|\nabla fij|*ei$, where ei denotes the unit vectors directed from said picture elements Pij to said predetermined picture element P0, and * denotes the inner product, (iv) a representative value calculating means for finding a representative value $\{\nabla fij/|\nabla fij|*ei\}r$, which is representative of said projections $\nabla fij/|\nabla fij|*ei$, for each of said lines Li, (v) a mean calculating means for calculating a mean-level value of said representative values $\{\nabla fij/|\nabla fij|*ei\}r$, which have been found for the plurality of said lines Li, and (vi) a judgment means for judging, from said mean-level value, whether said predetermined picture element P0 falls or does not fall within the region corresponding to said circular pattern.

In the second method and apparatus and the third method and apparatus for classifying picture elements in accordance with the present invention, the number of the lines Li, where $i=1, 2, \ldots, n$, i.e. the value of n, is not limited to a specific value, but may take any value which will satisfy the level of accuracy required in the judgment, which will allow the operations to be completed within a specified time, or the like.

In the second method and apparatus for classifying picture elements in accordance with the present invention, the predetermined distance ri may vary for the respective lines Li. For example, in cases where the object pattern is elliptic and has a longer axis extending in a predetermined direction, the predetermined distance ri in said predetermined direction may be longer than the predetermined distance ri in the direction normal to said predetermined direction (i.e. in the direction along which the shorter axis of the elliptic pattern extends).

In the third method and apparatus for classifying picture elements in accordance with the present invention, the number of the predetermined distances rij, where $j=1, 2, \ldots, m$, i.e. the value of m, is not limited to a specific value. Also, the value of m may vary for the respective lines Li, where $i=1, 2, \ldots, n$. For example, in cases where the object pattern is elliptic and has a longer axis extending in a predetermined direction, the value of m in said predetermined direction may be made larger than the value of m in the direction normal to said predetermined direction.

The term "gradient" as used herein means the vector expressed as $$\nabla f(m,n) = (f(m+1,n) - f(m,n), f(m,n+1) - f(m,n)) \quad (1)$$

In Formula (1), (m,n) denotes the x and y coordinates of a certain picture element P in a radiation image, (m+1,n) denotes the coordinates of a picture element P', which is adjacent to the picture element P in the x direction, and (m,n+1) denotes the coordinates of a picture element P'', which is adjacent to the picture element P in the y direction. Also, f(m,n), f(m+1,n), and f(m,n+1) respectively denote the values of the image signal components representing the picture elements P, P', and P''.

The term "representative value" as used herein for the third method and apparatus for classifying picture elements in accordance with the present invention means a value suitable for expressing the characteristics of a circular pattern, which appear on an image profile along each of the lines Li, on the basis of the projections $\nabla fij/|\nabla fij|*ei$. By way of example, in cases where, typically, the circular pattern has the characteristic that the value of the image signal component corresponding to the center position of the circular pattern is smaller than the values of the image signal components corresponding to the peripheral portions of the circular pattern, the maximum value of the projections $\nabla fij/|\nabla fij|*ei$ for each of the lines Li may be employed as the representative value. In cases where the circular pattern has the characteristic that the value of the image signal component corresponding to the center position of the circular pattern is larger than the values of the image signal components corresponding to the peripheral portions of the circular pattern, the minimum value of the projections $\nabla fij/|\nabla fij|*ei$ for each of the lines Li may be employed as the representative value. However, in cases where the maximum value of the projections $\nabla fij/|\nabla fij|*ei$ for each of the lines Li is employed as the representative value, if, for example, all of the projections $\nabla fij/|\nabla fij|*ei$ for a certain line Lk among a plurality of the lines Li are negative, no effective maximum value for the projections $\nabla fij/|\nabla fij|*ei$ will be found for the line Lk. In such cases, a maximum value of the projections $\nabla fij/|\nabla fij|*ei$ can be found from some extra simple calculations and employed as the representative value. Alternatively, for example, a value of 0.0 may be employed as the representative value. The term "representative value" as used herein for the third method and apparatus for classifying picture elements in accordance with the present invention may also mean a value which substantially represents the maximum value or the minimum value of the projections $\nabla fij/|\nabla fij|*ei$, for example, a value calculated from the formula expressed as (maximum value) − (predetermined value) or (minimum value) + (predetermined value).

In the second method and apparatus and the third method and apparatus for classifying picture elements in accordance with the present invention, the projections $\nabla fi/|\nabla fi|*ei$ or the projections $\nabla fij/|\nabla fij|*ei$ are calculated. Such embodiments are substantially identical with embodiments wherein the projections $\nabla fi/|\nabla fi|*ei'$ are calculated, where ei' denotes the unit vectors directed from the picture elements Pi away from the predetermined picture element P0 along the lines Li, or embodiments wherein the projections $\nabla fij/|\nabla fij|*ei'$ are calculated, where ei' denotes the unit vectors directed from the picture elements Pij away from the predetermined picture element P0 along each of the lines Li, except that the maximum values and the minimum values of the components are reversed. The second method and apparatus and the third method and apparatus for classifying picture elements in accordance with the present invention are meant to embrace within their scopes embodiments which are substantially identical.

The term "mean-level value" as used herein for the second method and apparatus and the third method and apparatus for classifying picture elements as belonging to or not belonging to a circular pattern in accordance with the present invention typically means the arithmetical mean of the projections $\nabla fi/|\nabla fi|*ei$, of the projections $\nabla fij/|\nabla fij|*ei$, or of the representative values. Alternatively, the mean-level value may be the geometric mean of the above projections or of the representative values. As another alternative, the above projections or the representative values may be weighted, and the mean value of the weighted projections or of the weighted representative values may be employed as the mean-level value.

With the second method and apparatus and the third method and apparatus for classifying picture elements in accordance with the present invention, the normalized gradients $\nabla fi/|\nabla fi|$ or the normalized gradients $\nabla fij/|\nabla fij|$ are calculated. Thereafter, calculations are carried out which yield the projections of the normalized gradients on vectors directed from the picture elements Pi or the picture elements Pij to the predetermined picture element P0, the projections being expressed as $\nabla fi/|\nabla fi|*ei$ or $\nabla fij/|\nabla fij|*ei$. Therefore, adverse effects from contrast in the circular pattern can be eliminated, and an accurate judgment can be made with respect to the shape of the pattern.

Also, with the third method and apparatus for classifying picture elements in accordance with the present invention, the representative values are calculated from the image signal components fij representing the picture elements Pij, which are located on each of a plurality of lines Li extending from a predetermined picture element P0 to peripheral parts of the radiation image, and which are spaced a plurality of predetermined distances rij from the predetermined picture element P0. Therefore, even when circular patterns having different sizes are present in a radiation image and even when the shapes of the circular patterns deviate slightly from circles, for example, are elliptic, an accurate judgment can be made as to whether the predetermined picture element P0 falls or does not fall within the region corresponding to a circular pattern. Even in such cases, adverse effects from the contrast in the circular pattern can be eliminated, and an accurate judgment can be made with respect to the shape of the pattern.

With the second method and apparatus and the third method and apparatus for classifying picture elements in accordance with the present invention, a judgment is made as to whether a predetermined picture element P0 in a radiation image falls or does not fall within the region corresponding to a circular pattern. If the judgment operation is repeated for all the image signal components representing the radiation image, i.e. if each of the image signal components are processed with one of the filters in accordance with the present invention, it is possible to detect the circular pattern in the radiation image.

The present invention still further provides a fourth method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:

(i) calculating:

(a) a mean-level value Q0 from the values of image signal components representing a plurality of picture elements, which are located in a center region including a predetermined picture element P0, and (b) mean-level values Qi, where i=1, 2, ..., n, each representing the mean level of the values of image signal components representing a plurality of picture elements, which are located in each of a plurality of peripheral regions surrounding said center region, (ii) calculating the differences $\Delta i$, where i=1, 2, ..., n, between said mean-level value Q0 corresponding to said center region and the respective mean-level values Qi, where i=1, 2, ..., n, corresponding to said peripheral regions, (iii) finding a first characteristic value, which is representative of said differences $\Delta i$, and a second characteristic value, which represents the amount of dispersion in said differences $\Delta i$, (iv) calculating the ratio of said first characteristic value to said second characteristic value, (v) comparing said ratio with a predetermined threshold value, and (vi) from the results of the comparison, judging whether said predetermined picture element P0 falls or does not fall within tne region inside of said circular pattern.

The fourth method for classifying picture elements in accordance with the present invention may further comprise a step for finding representative values Qi so that picture elements can be found accurately in circular patterns having various sizes and in circular patterns, whose shapes deviate slightly from circles, for example, whose shapes are elliptic.

Specifically, the present invention also provides a fifth method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:

(i) calculating:

(a) a mean-level value Q0 of the values of image signal components representing a plurality of picture elements, which are located in a center region including a predetermined picture element P0, and (b) mean-level values Qij, each representing the mean level of the values of image signal components representing a plurality of picture elements located in each of a plurality of peripheral regions, each said peripheral region including each of picture elements Pij, which are located on each of a plurality of lines Li, where i=1, 2, ..., n, extending from said predetermined picture element P0 to peripheral parts of said radiation image, and which are spaced a plurality of predetermined distances rij, where j=1, 2, ..., m, from said predetermined picture element P0, (ii) finding a representative value Qi, which is representative of said mean-level values, for each of said lines Li, (iii) calculating the differences $\Delta i$, where $i=1, 2, \ldots, n$, between said mean-level value $Q0$ corresponding to said center region and the respective representative values $Qi$, which have been found for the plurality of said lines $Li$, (iv) finding a first characteristic value, which is representative of said differences $\Delta i$, and a second characteristic value, which represents the amount of dispersion in said differences $\Delta i$, (v) calculating the ratio of said first characteristic value to said second characteristic value, (vi) comparing said ratio with a predetermined threshold value, and (vii) from the results of the comparison, judging whether said predetermined picture element $P0$ falls or does not fall within the region corresponding to said circular pattern.

The present invention further provides a fourth apparatus for carrying out the fourth method for classifying picture elements as belonging to or not belonging to a circular pattern in accordance with the present invention.

Specifically, the present invention further provides a fourth apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a mean calculating means for calculating:

(a) a mean-level value $Q0$ of the values of image signal components representing a plurality of picture elements, which are located in a center region including a predetermined picture element $P0$, and (b) mean-level values $Qi$, where $i=1, 2, \ldots, n$, each representing the mean level of the values of image signal components representing a plurality of picture elements, which are located in each of a plurality of peripheral regions surrounding said center region, (ii) a difference calculating means for calculating the differences $\Delta i$, where $i=1, 2, \ldots, n$, between said mean-level value $Q0$ corresponding to said center region and the respective mean-level values $Qi$, where $i=1, 2, \ldots, n$, corresponding to said peripheral regions, (iii) a characteristic value calculating means for finding a first characteristic value, which is representative of said differences $\Delta i$, and a second characteristic value, which represents the amount of dispersion in said differences $\Delta i$, (iv) a ratio calculating means for calculating the ratio of said first characteristic value to said second characteristic value, and (v) a judgment means which compares said ratio with a predetermined threshold value and judges, from the results of the comparison, whether said predetermined picture element $P0$ falls or does not fall within the region corresponding to said circular pattern.

The present invention still further provides a fifth apparatus for carrying out the fifth method for classifying picture elements in accordance with the present invention.

Specifically, the present invention still further provides a fifth apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a mean calculating means for calculating:

(a) a mean-level value $Q0$ of the values of image signal components representing a plurality of picture elements, which are located in a center region including a predetermined picture element $P0$, and (b) mean-level values $Qij$, each representing the mean level of the values of image signal components representing a plurality of picture elements located in each of a plurality of peripheral regions, each said peripheral region including one of a plurality of picture elements $Pij$, which are located on each of a plurality of lines $Li$, where $i=1, 2, \ldots, n$, extending from said predetermined picture element $P0$ to the peripheral parts of said radiation image, and which picture elements $Pij$ are spaced a plurality of predetermined distances $rij$, where $j=1, 2, \ldots, m$, from said predetermined picture element $P0$, (ii) a representative value calculating means for finding a representative value $Qi$, which is representative of said mean-level values, for each of said lines $Li$, (iii) a difference calculating means for calculating the differences $\Delta i$, where $i=1, 2, \ldots, n$, between said mean-level value $Q0$ corresponding to said center region and the respective representative values $Qi$, which have been found for the plurality of said lines $Li$, (iv) a characteristic value calculating means for finding a first characteristic value, which is representative of said differences $\Delta i$, and a second characteristic value, which represents the amount of dispersion in said differences $\Delta i$, (v) a ratio calculating means for calculating the ratio of said first characteristic value to said second characteristic value, and (vi) a judgment means which compares said ratio with a predetermined threshold value and judges, from the results of the comparison, whether said predetermined picture element $P0$ falls or does not fall within the region inside of said circular pattern.

The term "mean-level value" as used herein for the fourth method and apparatus and the fifth method and apparatus for classifying picture elements in accordance with the present invention typically means the arithmetical mean of the values of the image signal components representing a plurality of picture elements located in each region. Alternatively, the mean-level value may be the geometric mean, the median value, or the like, of the values of the image signal components representing a plurality of picture elements located in each region.

The term "first characteristic value" as used herein for the fourth method and apparatus and the fifth method and apparatus for classifying picture elements in accordance with the present invention means a value which is representative of a plurality of the differences $\Delta i$. For example, the first characteristic value may be the mean-level value, the maximum value, or the minimum value of the differences $\Delta i$.

The term "second characteristic value" as used herein for the fourth method and apparatus and the fifth method and apparatus for classifying picture elements in accordance with the present invention means a value which represents the amount of dispersion in a plurality of the differences $\Delta i$. For example, the second characteristic value may be the variance of the differences $\Delta i$, or the value given by the formula: (maximum value) — (minimum value).

In the fourth method and apparatus and the fifth method and apparatus for classifying picture elements in accordance with the present invention, the number of lines $Li$, where $i=1, 2, \ldots, n$, i.e. the value of n, is not limited to a specific value, but may take any value which will satisfy the level of accuracy required of the judgment, which will allow the operations to be completed within a specified time, or the like.

In the fifth method and apparatus for classifying picture elements in accordance with the present invention, the number of the predetermined distances $rij$, where $j=1, 2, \ldots, m$, i.e. the value of m, is not limited to a specific value. Also, the value of m may vary for the respective lines $Li$, where $i=1, 2, \ldots, n$. For example, in cases where the object pattern is elliptic and has a longer axis extending in a predetermined direction, the value of m in said predetermined direction may be larger than the value of m in the direction normal to said predetermined direction. In cases where the distance varies continuously from the minimum distance, $rimin$, to the maximum distance, $rimax$, along each of the lines, $rij$, where $j=1, 2, \ldots, m$, can be regarded as taking various values between $rimin$ and $rimax$. Therefore, the term "a plurality of predetermined distances $rij$" as used herein for the fourth method and apparatus and the fifth method and apparatus for classifying picture elements in accordance with the present invention also embraces the cases wherein the value of the distance, $rij$, varies continuously.

The term "representative value" as used herein for the fifth method and apparatus for classifying picture elements in accordance with the present invention means a value which is suitable for expressing the presence or absence or the amount of the differences between the mean-level value $Q0$ of the values of image signal components representing the picture elements, which are located in the center region including the predetermined picture element $P0$, and the mean-level values $Qij$, where $j=1, 2, \ldots, m$, each of which represents the mean level of the values of image signal components representing the picture elements located in each of the peripheral regions, each said peripheral region including one of the picture elements $Pij$ located on one of the lines $Li$. By way of example, in cases where, typically, the circular pattern has the characteristic that the value of the image signal component corresponding to the center position of the circular pattern is smaller than the values of the image signal components corresponding to the peripheral portions of the circular pattern, the maximum value of the mean-level values $Qij$ corresponding to the peripheral regions located along each of the lines $Li$ may be employed as the representative value. In cases where the circular pattern has the characteristic that the value of the image signal component corresponding to the center position of the circular pattern is larger than the values of the image signal components corresponding to the peripheral portions of the circular pattern, the minimum value of the mean-level values $Qij$ corresponding to the peripheral regions located along each of the lines $Li$ may be employed as the representative value. However, in cases where the maximum value of the mean-level values $Qij$ corresponding to the peripheral regions located along each of the lines $Li$ is employed as the representative value, if, for example, all of the mean-level values $Qij$ corresponding to the peripheral regions located along a certain line $Lk$ among a plurality of the lines $Li$ are negative, no effective maximum value of the mean-level values $Qij$ will be found for the link $Lk$. In such cases, a maximum value of the mean-level values $Qij$ found from some extra simple calculations may be employed as the representative value. Alternatively, for example, a value of 0.0 may be employed as the representative value. Accordingly, the term "representative value" as used herein for the fifth method and apparatus for classifying picture elements in accordance with the present invention also means a value employed in lieu of a representative value in cases where a representative value is obtained, which does not effectively represent the differences between the mean-level value $Q0$ corresponding to the center region and the mean-level values $Qij$ corresponding tot he peripheral regions located along each of the lines $Li$. The term "representative value" as used herein for the fifth method and apparatus for classifying picture elements in accordance with the present invention further means a value which substantially represents the maximum value or the minimum value of the mean-level values $Qij$ corresponding to the peripheral regions located along each of the lines $Li$, for example, the value given by one of the formulas (maximum value) — (predetermined value) or (minimum value) + (predetermined value).

Also, in the fourth method and apparatus for classifying picture elements in accordance with the present invention, in cases where the values of the differences $\Delta i$ do not effectively represent the differences between the mean-level value $Q0$ corresponding to the center region and the mean-level values $Qi$ corresponding to the peripheral regions surrounding the center region, a value of 0.0 or the like may be employed in lieu of the values obtained for the differences $\Delta i$.

The fourth method and apparatus and the fifth method and apparatus for classifying picture elements in accordance with the present invention can be embodied in various ways such that the aforesaid operations are substantially carried out. For example, in the fifth method and apparatus for classifying picture elements in accordance with the present invention, the maximum value $Qi$ of the mean-level values $Qij$ corresponding to the peripheral regions located along each of the lines $Li$ may be found as the representative value. Thereafter, the differences between the mean-level value $Q0$ corresponding to the center region and the respective representative values $Qi$, which have been found for the plurality of the lines $Li$, may be calculated from the formula $$\Delta i = Qi - Q0 \qquad (2)$$

Alternatively, the differences between the mean-level value $Q0$ and the respective mean-level values $Qij$ may be calculated from the formula $\Delta ij = Qij - Q0$, and thereafter the maximum value of the differences $\Delta ij$ corresponding to each of the lines $Li$ may be found. The maximum value thus found is identical with the value calculated from Formula (2). The fifth method and apparatus for classifying picture elements in accordance with the present invention also embraces such embodiments in its scope.

With the fourth method and apparatus and the fifth method and apparatus for classifying picture elements in accordance with the present invention, the ratio of the first characteristic value to the second characteristic value is calculated and compared with a predetermined threshold value. From the results of the comparison, judgments are made as to whether predetermined picture elements fall or do not fall within the region corresponding to the circular pattern. Therefore, a circular pattern and a linear pattern, which are present in a radiation image, can be accurately discriminated from each other with a single filter, and accurate judgments can be made as to whether predetermined picture elements in the radiation image fall or do not fall within the region corresponding to a circular pattern in the radiation image.

Also, with the fifth method and apparatus for classifying picture elements in accordance with the present invention, the mean-level values Qij are calculated, each representing the mean level of the values of image signal components representing the picture elements located in each of the peripheral regions, each said peripheral region including one picture elements Pij. The picture elements Pij are located on each of the lines Li extending from a predetermined picture element P0 to the peripheral parts of the radiation image, and are spaced a plurality of predetermined distances rij, where j=1, 2, . . . , m, from the predetermined picture element P0. The representative value Qi, which is representative of the mean-level values, is then found for each of the lines Li. Therefore, even when circular patterns having different sizes are present in a radiation image and even when the shapes of the circular patterns deviate slightly from circles, for example, are elliptic, an accurate judgment can be made as to whether a predetermined picture element P0 falls or does not fall within the region corresponding to a circular pattern.

The fourth method and apparatus and the fifth method and apparatus for classifying picture elements in accordance with the present invention may be modified such that peripheral regions, which are relatively more remote from the predetermined picture element P0, have larger areas.

The present invention also provides a method for classifying picture elements as belonging to or not belonging to a pattern wherein, from an image signal made up of a series of image signal components representing a radiation image of an object, judgments are made as to whether predetermined picture elements in the radiation image fall or do not fall within the region corresponding to a predetermined pattern in the radiation image, the method for classifying picture elements comprising the steps of:

(i) calculating:

(a) the value Q0 of an image signal component representing a predetermined picture element P0, or a mean-level value Q0 of the values of image signal components representing a plurality of picture elements, which are located in a center region including said predetermined picture element P0, and (b) mean-level values Qij, each representing the mean level of the values of image signal components representing a plurality of picture elements located in each of a plurality of peripheral regions, each said peripheral region including one of a plurality of picture elements Pij, which are located on each of a plurality of lines Li, where i=1, 2, . . . , n, extending from said predetermined picture element P0 to the peripheral parts of said radiation image, and which picture elements Pij are spaced a plurality of predetermined distances rij, where j=1, 2, . . . , m, from said predetermined picture element P0, the areas of said peripheral regions being selected such that peripheral regions which are more remote from said predetermined picture element P0 have larger areas, (ii) calculating a characteristic value Ci, which represents the change in said radiation image in the direction along which each of said lines Li extends, for each of said lines Li, and (iii) from a plurality of the characteristic values Ci, which have been calculated for the plurality of directions along which said lines Li extend, judging whether said predetermined picture element P0 falls or does not fall within the region corresponding to said predetermined pattern.

The present invention further provides an apparatus for classifying picture elements as belonging to or not belonging to a pattern wherein, from an image signal made up of a series of image signal components representing a radiation image of an object, judgments are made as to whether predetermined picture elements in the radiation image fall or do not fall within the region corresponding to a predetermined pattern in the radiation image, the apparatus for classifying picture elements comprising:

(i) a mean calculating means for calculating:

(a) the value Q0 of an image signal component representing a predetermined picture element P0, or a mean-level value Q0 of the values of image signal components representing a plurality of picture elements, which are located in a center region including said predetermined picture element P0, and (b) mean-level values Qij, each representing the mean level of the values of image signal components representing a plurality of picture elements located in each of a plurality of peripheral regions, each said peripheral region including one of a plurality of picture elements Pij, which are located on each of a plurality of lines Li, where i=1, 2, . . . , n, extending from said predetermined picture element P0 to the peripheral parts of said radiation image, and which picture elements Pij are spaced a plurality of predetermined distances rij, where j=1, 2, . . . , m, from said predetermined picture element P0, the areas of said peripheral regions being selected such that peripheral regions which are more remote from said predetermined picture element P0 have larger areas, (ii) a characteristic value calculating means for calculating a characteristic value Ci, which represents the change in said radiation image in the direction along which each of said lines Li extends, for each of said lines Li, and (iii) a judgment means for judging, from a plurality of the characteristic values Ci, which have been calculated for the plurality of directions along which said lines Li extend, whether said predetermined picture element P0 falls or does not fall within the region corresponding to said predetermined pattern.

The term "mean-level value" as used herein for the method and apparatus for classifying picture elements in accordance with the present invention means one of various types of values which represent the mean level of the values of the image signal components representing a plurality of picture elements located in each region. For example, the mean-level value may be the arithmetical mean, the geometric mean, or the median value of the values of the image signal components representing a plurality of picture elements located in each region. Alternatively, the mean-level value may be calculated with the formula expressed as (maximum value + minimum value)/2.

In the method and apparatus for classifying picture elements in accordance with the present invention, the areas of the peripheral regions are set such that peripheral regions which are move remote from the predetermined picture element P0 will have larger areas. This does not mean that all of the peripheral regions which are located at equal distances from the predetermined picture element P0 will have equal areas. For example, in cases where a filter having a high sensitivity in certain directions is to be implemented, the relationship between the distances and the areas of the peripheral regions may vary in respective directions. Also, in each direction, the areas of adjacent peripheral regions need not necessarily be different from each other. For example, in each direction, the areas of peripheral regions may vary step-wise such that a group of peripheral regions located close to the predetermined picture element P0 will all have small areas, a group of peripheral regions located further from the predetermined picture element P0 will all have somewhat larger areas, and a group of peripheral regions located even further from the predetermined picture element P0 will all have relatively larger areas. The method and apparatus for classifying picture elements in accordance with the present invention embrace various such embodiments within their scopes.

In the method and apparatus for classifying picture elements in accordance with the present invention, the value of j, i.e. the number of peripheral regions located along each of the lines Li, may vary for the respective lines Li so that a picture element belonging to, for example, an elliptic pattern can be so classified.

The term "characteristic value Ci" as used herein for the method and apparatus for classifying picture elements in accordance with the present invention means, for example, the maximum value of the differences between the mean-level values (Q0, Qij) corresponding to adjacent regions located along each of the lines Li, or the maximum value of the differences between the mean-level value Q0 corresponding to the center region and the mean-level values Qij corresponding to the peripheral regions located along each of the lines Li. Alternatively, the characteristic value Ci may be the maximum value of weighted differences between the mean-level values (Q0, Qij) corresponding to adjacent regions located along each of the lines Li, or the maximum value of weighted differences between the mean-level value Q0 corresponding to the center region and the mean-level values Qij corresponding to the peripheral regions located along each of the lines Li. As another alternative, the characteristic value Ci may be the value given by the formula (maximum value of the aforesaid differences) − (predetermined value), the mean value of the aforesaid differences, or the like.

In general, an image signal representing a radiation image includes much noise due to the sway in the radiation during the recording of the radiation image, or the like. If the areas of the aforesaid regions are small, errors in the judgment as to whether a predetermined picture element P0 falls or does not fall within the region corresponding to a predetermined pattern will occur due to the adverse effects of the noise. Also, the contour of the predetermined pattern, which is to be found, cannot be detected accurately. In order for the adverse effects of the noise to be eliminated, regions having large areas may be employed. However, if the areas of the regions are large, the location of the predetermined pattern cannot be detected accurately, and the contour of the predetermined pattern, which is to be found, cannot be detected accurately.

The method and apparatus for classifying picture elements in accordance with the present invention solves the problems described above. Specifically, with the method and apparatus for classifying picture elements in accordance with the present invention, regions having small areas are used close to the predetermined picture element P0. Therefore, an accurate judgment can be made as to whether a predetermined picture element P0 falls or does not fall within the region corresponding to the predetermined pattern. However, as described above, in cases where regions having small areas are employed, the judgment is adversely affected by noise. With the method and apparatus for classifying picture elements in accordance with the present invention, in order for this problem to be eliminated, regions remote from the predetermined picture element P0 are assigned large areas. Therefore, with the filter employed in the method and apparatus for classifying picture elements in accordance with the present invention, the judgment as to whether a predetermined picutre element P0 falls or does not fall within the region corresponding to a predetermined pattern is made from the mean-level values of the image signal components corresponding to regions having appropriate, comparatively large areas. Accordingly, the adverse effects of noise can be sufficiently prevented from affecting the judgment about a picture element.

DESCRIPTION OF THE PREFERRED EMBODIMENTS

The present invention will hereinbelow be described in further detail with reference to the accompanying drawings.

First, embodiments of the first method and apparatus for classifying picture elements as belonging to or not belonging to a circular pattern in accordance with the present invention will be described below. In the embodiments, an X-ray image is stored on a stimulable phosphor sheet, and an image of a tumor, which typically has an approximately spherical shape in the lungs of a human body, is detected from the X-ray image. In a visible image reproduced from the X-ray image, the tumor image typically appears as an approximately circular pattern having a lower density than the areas of the image surrounding the tumor image.

Figure 4:
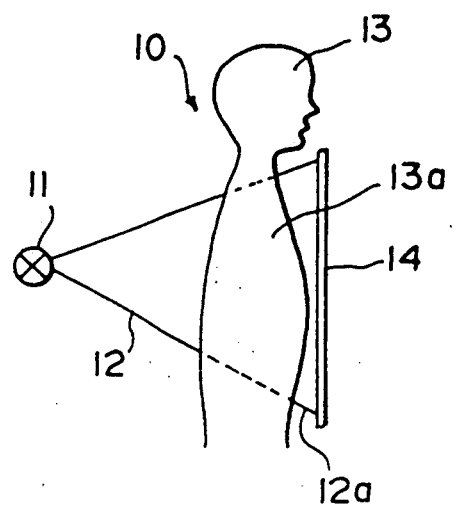
FIG. 4 is a schematic view showing an example of an X-ray image recording apparatus.

FIG. 4 is a schematic view showing an example of an X-ray image recording apparatus.

With reference to FIG. 4, X-rays 12 are produced by an X-ray source 11 of an X-ray image recording apparatus and irradiated to the chest 13a of a human body 13. X-rays 12a, which have passed through the human body 13, impinge upon a stimulable phosphor sheet 14. In this manner, an X-ray image of the chest 13a of a human body 13 is stored on the stimulable phosphor sheet 14.

Figure 5:
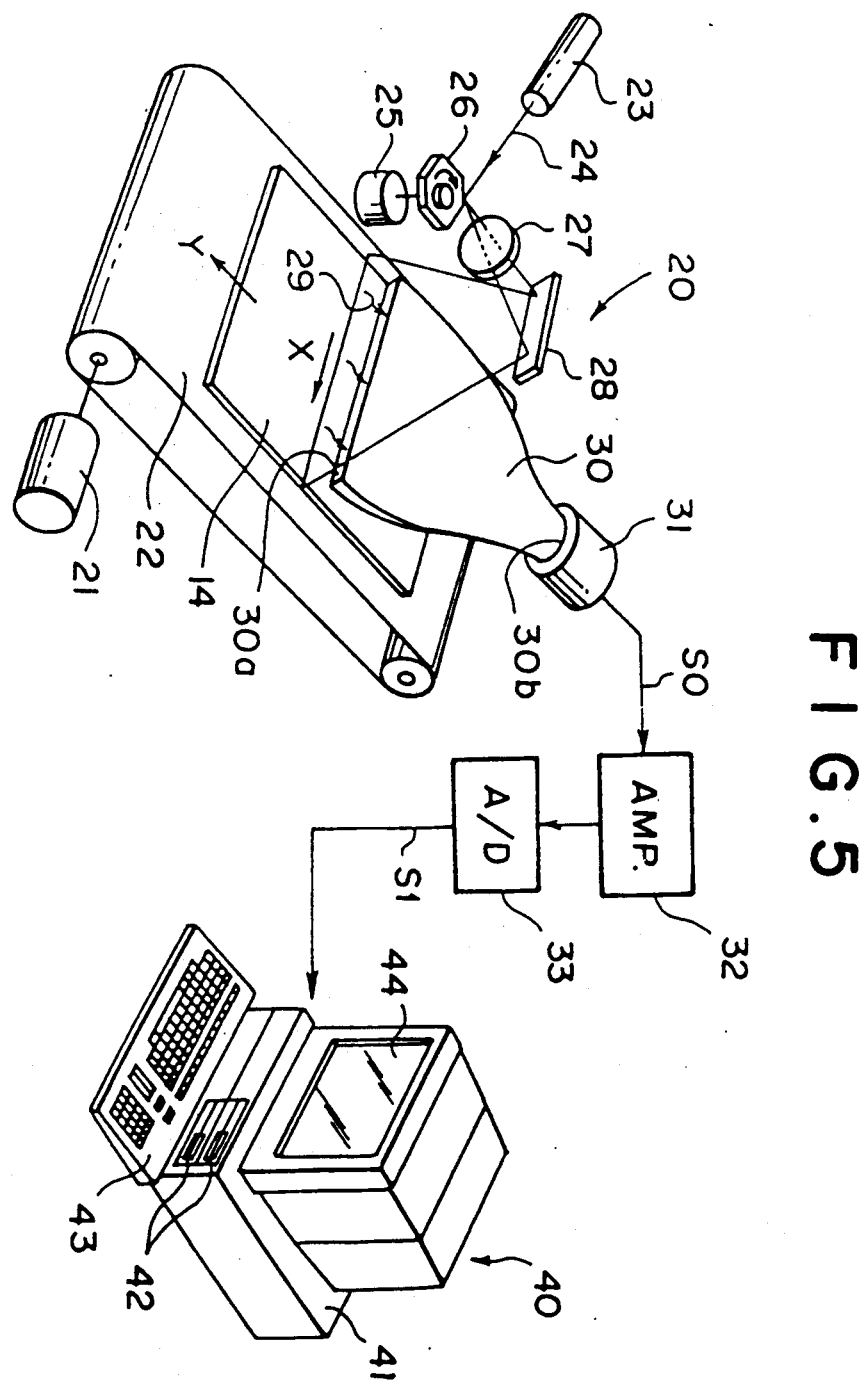
FIG. 5 is a perspective view showing an example of an X-ray image read-out apparatus and a computer system which is provided with the embodiment of the apparatus for classifying picture elements in accordance with the present invention.

FIG. 5 is a perspective view showing an example of an X-ray image read-out apparatus and a computer system which is provided with the embodiment of the apparatus for classifying picture elements in accordance with the present invention.

With reference to FIG. 5, a stimulable phosphor sheet 14, on which an X-ray image has been stored, is placed at a predetermined position in an X-ray image read-out apparatus 20. The stimulable phosphor sheet 14 is then conveyed in a sub-scanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as an acrylic plate and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33 into an electric image signal S1.

The image signal S1 is then fed into a computer system 40. The computer system 40 is provided with an embodiment of the first apparatus for classifying picture elements as belonging to or not belonging to a circular pattern in accordance with the present invention. The computer system 70 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

From the image signal S1, which is made up of a series of image signal components representing the X-ray image and which has been fed into the computer system 40, a judgment is made as to whether a predetermined picture element P0 in the X-ray image falls or does not fall within the region corresponding to a tumor image (circular pattern) in the X-ray image. Each of the picture elements in an X-ray image may be assigned as the predetermined picture element P0, and the judgment operation may be repeated for the image signal components representing each of the picture elements of the X-ray image. In this manner, the tumor image in the X-ray image can be detected.

Figure 1:
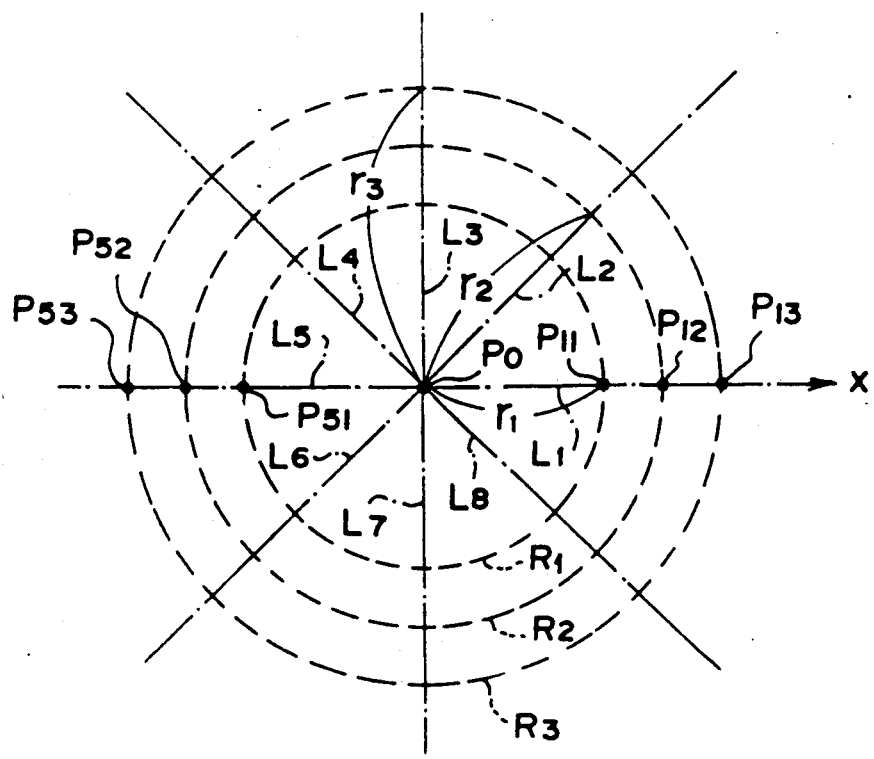
FIG. 1 shows imaginary lines drawn around a predetermined picture element P0 in an X-ray image as an aid in explaining how a spatial-domain filter works, which spatial-domain filter is employed to detect a circular tumor image in embodiments of the first method and apparatus for classifying picture elements in accordance with the present invention.

FIG. 1 shows imaginary lines drawn around a predetermined picture element P0 in an X-ray image as an aid in explaining how a spatial-domain filter works, which spatial-domain filter is employed to detect a circular tumor image in the embodiments of the first method and apparatus for classifying picture elements as belonging to or not belonging to a circular pattern in accordance with the present invention. Judgment is made as to whether a predetermined picture element P0 in the X-ray image falls or does not fall within the region corresponding to the tumor image in the X-ray image. The tumor image in the X-ray image can be detected by processing the image signal components representing the picture elements of the X-ray image with the filter illustrated in FIG. 1.

Figure 2:
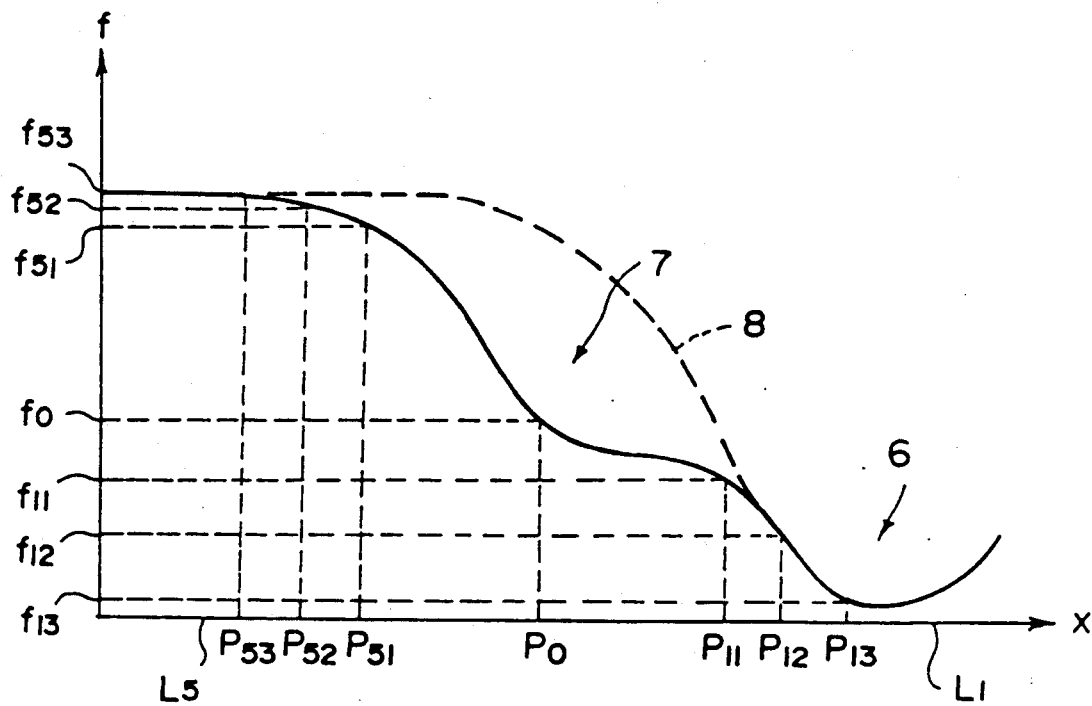
FIG. 2 is a graph showing an example of a prifle of the X-ray image around a predetermined picture element P0 in the direction (x direction) along which the lines L1 and L5 shows in FIG. 1 extend.

FIG. 2 is a graph showing an example of a profile of the X-ray image around a predetermined picture element P0 in the direction (x direction) along which the lines L1 and L5 shown in FIG. 1 extend. In this example, the predetermined picture element P0 is located approximately at the middle of a tumor image 7, which is close to a rib image 6. Typically, the profile of a tumor image (i.e. the distribution of the values of the image signal components representing the tumor image) is approximately symmetric bilaterally. However, in cases where, for example, the tumor image 7 is close to a rib image 6 as in the illustrated example, it often occurs that the profile of the tumor image 7 is not symmetric bilaterally. It is important that the tumor image 7 can be detected even in such cases. In FIG. 2, the broken line 8 represents an example of the profile of an X-ray image including no tumor image.

As shown in FIG. 1, a plurality of (in this case, eight) imaginary lines Li, where i=1, 2, ..., 8, extend from the predetermined picture element P0 in the X-ray image to peripheral parts of the X-ray image. Also, imaginary circles Rj, where j=1, 2, 3, having radii r1, r2, and r3 extend around the predetermined picture element P0. The image signal component f0 representing the predetermined picture element P0 is found. Also, the image signal components fij are found which represent the picture elements Pij located at the intersections of each of the lines Li and the circles Rj. (In FIG. 1, P11, P12, and P13 denote picture elements located at the intersections of a line L1 and circles R1, R2, and R3. Also, P51, P52, and P53 denote the picture elements located at the intersections of a line L5 and the circles R1, R2, and R3.)

Thereafter, differences Δij between the value of the image signal component f0 representing the predetermined picture element P0 and the values of the image signal components fij representing the picture elements Pij are calculated from Formula (3), which is expressed as $$\Delta ij = fij - f0 \quad (3)$$

(i=1,2, ..., 8; j=1,2,3)

For each of the lines Li, the maximum value of the differences Δij, which have been calculated from Formula (3), is then found. Specifically, for the line L1, the maximum value of the differences between the value of the image signal component f0 representing the predetermined picture element P0 and the values of the image signal components f11, f12, and f13 representing the picture elements P11, P12, and P13 is found. The differences can be expressed as $$\Delta 11 = f11 - f0$$

$$\Delta 12 = f12 - f0$$

$$\Delta 13 = f13 - f0$$

In this example, as illustrated in FIG. 2, Δ13<Δ12<Δ11<0, and therefore the difference Δ11 is found to be the maximum value.

In this embodiment, typically, a circular pattern is detected which has the characteristic that the value of the image signal component corresponding to the center position of the circular pattern is smaller than the values of the image signal components corresponding to the peripheral portions of the circular pattern. However, for the line L1, the differences Δ13, Δ12, and Δ11 are negative. Therefore, the maximum value Δ11 which was found for the line L1 is not one which would be effective in the first method and apparatus for classifying picture elements in accordance with the present invention. Accordingly, in this case, a value of 0.0 is taken as the representative value, which is representative of the differences Δ11, Δ12, and Δ13, for the line L1. Alternatively, a maximum value, which is not negative and which has been found from the aforesaid differences, may directly be employed as the representative value.

For the line L5, the maximum value of the differences between the value of the image signal component f0 representing the predetermined picture element P0 and the values of the image signal components f51, f52, and f53 representing the picture elements P51, P52, and P53 is also found. The differences are expressed as $$\Delta 51 = f51 - f0$$

$$\Delta 52 = f52 - f0$$

$$\{53 = f53 - f0$$

In this example, the difference Δ53 is found to be the maximum value and is employed as the representative value, which is representative of the differences Δ51, Δ52, and Δ53, for the line L5.

In the manner described above, for each of the lines Li, the differences Δij between the value of the image signal component f0 representing the predetermined picture element P0 and the values of the image signal components fij representing the picture elements Pij are calculated, and the maximum value of the differences is found. In cases where the maximum value of the differences thus found is an effective one, the maximum value is taken as the representative value with respect to the corresponding line. In cases where the maximum value of the differences thus found is not an effective one, a value of 0.0 is taken as the representative value with respect to the corresponding line.

Thereafter, calculations are made to find the mean-level value, for example, the mean value, of two representative values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is given by the formula $$M15 = \frac{0.0 + \Delta 53}{2} \quad (4)$$

As described above, two lines extending from the predetermined picture element P0 in opposite directions are grouped into a single set. Therefore, a tumor image can be detected accurately even when, as shown in FIG. 2, it is present in the vicinity of, for example, a rib image and the distribution of the values of the image signal components representing the tumor image is asymmetric.

From the mean values M15, M26, M37, and M48, which have been calculated in the manner described above, a judgment is made as to whether the predetermined picture element P0 falls or does not fall within the region corresponding to the tumor image. In the first method and apparatus for classifying picture elements in accordance with the present invention, no limitation is imposed on how the judgment is made from the mean values M15, M26, M37, and M48. By way of example, the judgment may be made in the manner described below.

Figure 3:
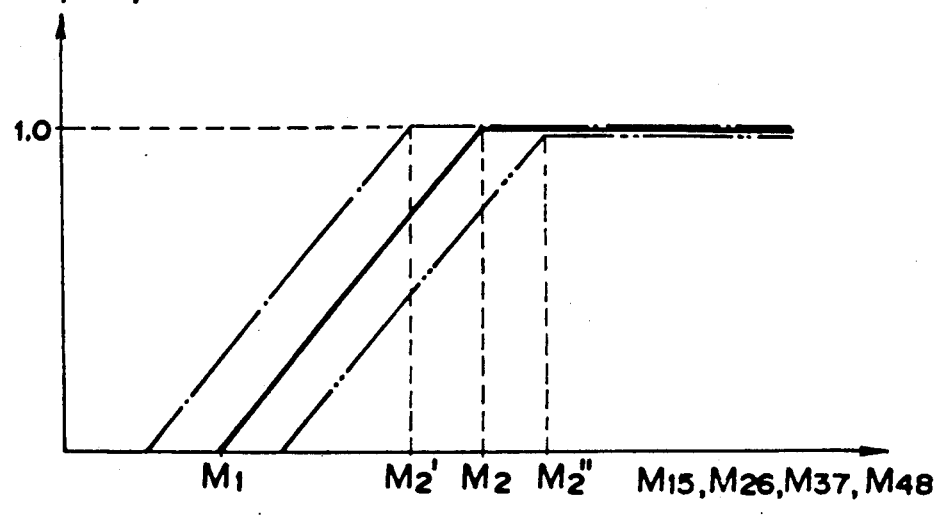
FIG. 3 is a graph showing how a characteristic value is determined which is used during a judgment as to whether a predetermined picture element P0 falls or does not fall within the region corresponding to the tumor image.

FIG. 3 is a graph showing how a characteristic value C1 is determined which is used during the judgment as to whether the predetermined picture element P0 falls or does not fall within the region corresponding to the tumor image. In FIG. 3, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C1 = C15 + C26 + C37 + C48 \quad (5)$$

is taken as the characteristic value C1. The characteristic value C1 will fall within the range of a minimum value 0.0 to a maximum value 4.0.

The characteristic value C1 is then compared with a predetermined threshold value Th1. From whether C1≧Th1 or C1<Th1, the judgment is made as to whether the predetermined picture element P0 falls or does not fall within the region corresponding to the tumor image.

In cases where the rating values C15, C26, C37, and C48 are calculated from an equation such as the one represented by the single-dot chained line in FIG. 3, wherein saturation is reached at a small mean value, e.g. M2', the characteristic value C1 calculated from Formula (5) will take a larger value in cases where the shape of the tumor image is closer to a circle. In cases where the rating values C15, C26, C37, and C48 are calculated from an equation such as the one represented by the double-dot chained line in FIG. 3, wherein saturation is reached at a large mean value, e.g. M2", the characteristic value C1 calculated from Formula (5) will take a larger value in cases where the contrast of the tumor image with respect to the surrounding image regions is higher. Therefore, an appropriate equation for transforming the mean values into the rating values can be selected in accordance with the characteristics of the tumor image which is to be found.

The process of making the judgment from the mean values M15, M26, M37, and M48 is not limited to using the characteristic value C1 and may be carried out in various other manners. For example, the mean values M15, M26, M37, and M48 may be compared with a threshold value Th2. In cases where all of the mean values M15, M26, M37, and M48 are larger than the threshold value Th2, it may be judged that the predetermined picture element P0 falls within the region corresponding to the tumor image. Alternatively, in cases where at least three of the mean values M15, M26, M37, and M48 are larger than the threshold value Th2, it may be judged that the predetermined picture element P0 falls within the region corresponding to the tumor image. As another alternative, the sum, M=M15+M26+M37+M48, of the mean values M15, M26, M37, and M48 may be calculated and compared with a threshold value Th3. In cases where M≧Th3, it may be judged that the predetermined picture element P0 falls within the region corresponding to the tumor image.

Embodiments of the third method and apparatus for classifying picture elements as belonging to or not belonging to a circular pattern in accordance with the present invention will be described hereinbelow. In the embodiments, a judgment as to whether the predetermined picture element P0 shown in FIG. 1 and FIG. 2 falls or does not fall within the region corresponding to the tumor image (circular pattern) is made in the manner described below with an apparatus which is incorporated in the computer system 40 shown in FIG. 5.

Specifically, calculations are made to find the gradients $\nabla f_{ij}$ of the image signal components $f_{ij}$, representing the picture elements Pij, where $i=1, 2, \ldots, 8$ and $j=1, 2, 3$.

Figure 6:
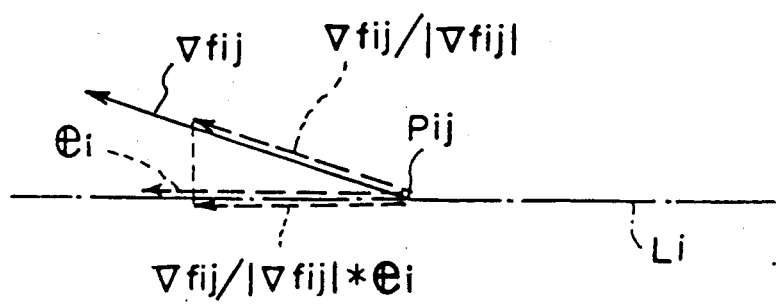
FIG. 6 is an explanatory view showing the vector of a gradient $\nabla fij$ of an image signal component fij in embodiments of the second method and apparatus and the third method and apparatus for classifying picture elements in accordance with the present invention.

FIG. 6 shows the gradient of an image signal component $f_{ij}$. How it is calculated is described below.

After the gradients $\nabla f_{ij}$ have been calculated, the magnitude of the gradients $\nabla f_{ij}$ are made equal to 1.0. Specifically, the normalized gradients $\nabla f_{ij}/|\nabla f_{ij}|$ can be calculated by dividing the gradients $\nabla f_{ij}$ by their magnitudes $|\nabla f_{ij}|$.

Thereafter, the projections of the normalized gradients $\nabla f_{ij}/|\nabla f_{ij}|$ onto the vectors directed from the picture elements Pij to the predetermined picture element P0 are calculated. The projections are expressed as $\nabla f_{ij}/|\nabla f_{ij}|*e_i$, where $e_i$ denotes the unit vectors directed from the picture elements Pij to the predetermined picture element P0, and * denotes the inner product.

As for the sign of the projections, the direction heading towards the predetermined picture element P0 is taken as positive, and the direction heading away from the predetermined picutre element P0 is taken as negative. For each of the lines Li, where $i=1, 2, \ldots, 8$, the maximum value of the projections is found. The maximum value is expressed as $$\{\nabla f_{ij}/|\nabla f_{ij}|*e_i\}_m$$

$(i=1, 2, \ldots, 8)$

In these embodiments of the third method and apparatus for classifying picture elements in accordance with the present invention, the maximum value is employed as the representative value, which is representative of the value of the projections, for each of the lines Li.

Thereafter, the sum of the maximum values which were found for each of the respective lines Li is calculated. This sum is expressed as $$\sum_{i=1}^{8} \{\nabla fij/|\nabla fij|*ei\}m$$

The mean value of the maximum values can be obtained by dividing the sum by the number of lines Li (eight in this example). The sum is equal to the product of the mean value and a fixed number and can, therefore, be regarded as being equivalent to the mean value. In these embodiments of the third method and apparatus for classifying picture elements in accordance with the present invention, the sum is employed as the mean-level value of the representative values.

The sum expressed as $$\sum_{i=1}^{8} \{\nabla fij/|\nabla fij|*ei\}m$$

is taken as a characteristic value C1. The characteristic value C1 is then compared with a predetermined threshold value Th1. From whether $C1 \geq Th1$ or $C1 < Th1$, a judgment is made as to whether the predetermined picture element P0 falls or does not fall within the region corresponding to the tumor image.

With the filter described above, the gradients $\nabla fij$ are normalized, and only the projections thereof (i.e. the extent of differences in the value of the signal components in the directions of the lines Li) onto vectors directed from the picture elements Pij to the predetermined picture element P0 are taken into consideration. Therefore, a characteristic value C1 is obtained, which will be large for a tumor image having a circular shape and which does not depend on the contrast of the tumor image with respect to the image regions around the tumor image. Accordingly, the tumor image can be detected accurately.

As can be understood from FIG. 2, for the line L1, the projections $\nabla fij/|\nabla fij|*ei$, where j=1, 2, 3, are negative, and therefore the maximum value $\{\nabla fij/|\nabla fij|*ei\}m$ of the components is negative. Therefore, the maximum value thus found is not effective for the third method and apparatus for classifying picture elements in accordance with the present invention. Accordingly, for the line L1, instead of the maximum value being employed, a value of 0.0 may be assigned to the representative value.

In the aforesaid embodiments of the third method and apparatus for classifying picture elements in accordance with the present invention, as shown in FIG. 1, the image signal components fij representing the picture elements Pij located on eight lines, L1 through L8, are employed. However, the number of lines L1 is not limited to eight, but may, for example, be 16. Also, the distances from the predetermined picture element P0 are not limited to the three distances (r1, r2, and r3). In cases where the sizes of the tumor images, which are to be detected, are approximately the same, only a single distance need be employed (as in the second method and apparatus for classifying picture elements in accordance with the present invention). (In such cases, the operations for finding the representative values are unnecessary.) Also, in order for tumor images having various sizes to be detected more accurately, operations may be carried out for a plurality of distances whose lengths vary approximately continuously between the length of the distance r1 and the length of the distance r3.

Embodiments of the fourth method and apparatus and the fifth method and apparatus for classifying picture elements as belonging to or not belonging to a circular pattern in accordance with the present invention will be described below. In the embodiments, an X-ray image is stored on a stimulable phosphor sheet, and an image of a tumor, which typically has an approximately spherical shape in the mamma of a human body, is detected from the X-ray image. In a visible image reproduced from the X-ray image, the tumor image typically has an approximately circular pattern having a lower density than the image areas surrounding the tumor image.

Figure 9:
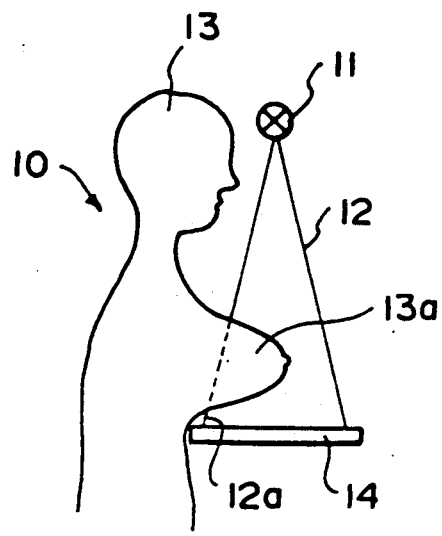
FIG. 9 is a schematic view showing an example of an X-ray image recording apparatus.

FIG. 9 is a schematic view showing an example of an X-ray image recording apparatus.

With reference to FIG. 9, X-rays 12 are produced by an X-ray source 11 of an X-ray image recording apparatus and irradiated to the mamma 13a of a human body 13. X-rays 12a, which have passed through the human body 13, impinge upon a stimulable phosphor sheet 14. In this manner, an X-ray image of the mamma 13a is stored on the stimulable phosphor sheet 14.

Thereafter, the X-ray image is read out in the same manner as that described above from the stimulable phosphor sheet 14 in the X-ray image read-out apparatus shown in FIG. 5. The image signal S1 obtained from the image read-out operation is fed into the computer system 40.

From the image signal S1, which is made up of a series of image signal components representing the X-ray image and which has been fed into the computer system 40, a judgment is made as to whether a predetermined picture element P0 in the X-ray image falls or does not fall within the region corresponding to a tumor image (circular pattern) in the X-ray image. Each picture element in the X-ray image may be assigned as the predetermined picture element P0, and the judgment operation may be repeated for each image signal component representing each picture element in the X-ray image. In this manner, the tumor image is detected in the X-ray image.

Figure 7:
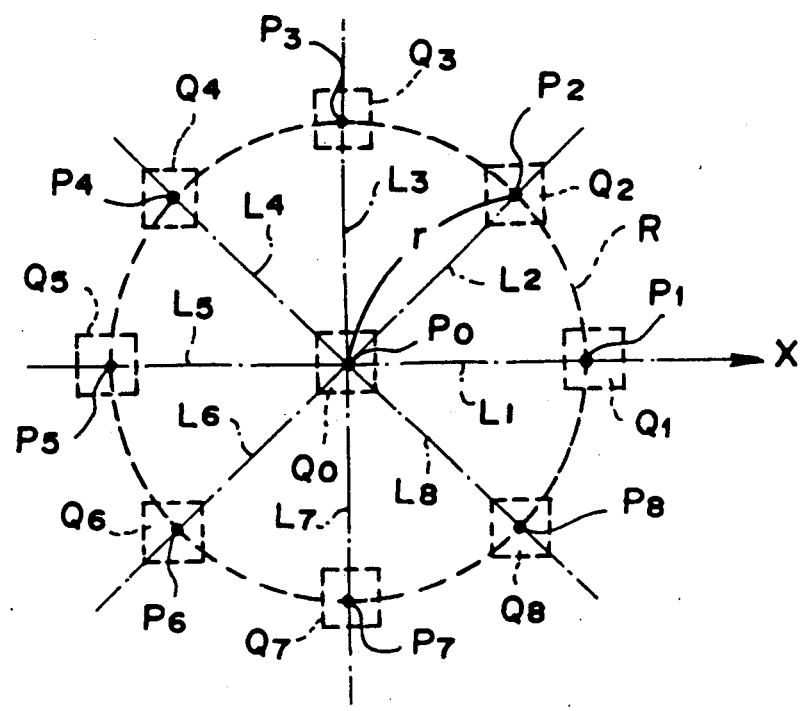
FIG. 7 is a diagram having a predetermined picture element P0 from an X-ray image in the middle, which diagram serves as an aid in explaining how a spatial-domain filter works, the spatial-domain filter being employed to detect a circular tumor image in embodiments of the fourth method and apparatus for classifying picture elements in accordance with the present invention.

FIG. 7 is a diagram having a predetermined picture element P0 from an X-ray image in the middle, which diagram serves as an aid in explaining how a spatial-domain filter works, the spatial-domain filter being employed to detect a circular tumor image in the embodiments of the fourth method and apparatus for classifying picture elements as belonging to or not belonging to a circular pattern in accordance with the present invention. Judgment is made as to whether a predetermined picture element P0 in the X-ray image falls or does not fall within the region corresponding to the tumor image in the X-ray image. The tumor image in the X-ray image can be detected by processing the image signal components representing the picture elements in the X-ray image with the filter illustrated in FIG. 7.

As shown in FIG. 7, a plurality of (in this case, eight) imaginary lines Li, where i=1, 2, ..., 8, extend from the predetermined picture element P0 in the X-ray image to the peripheral parts of the X-ray image. Also, an imaginary circular R having a radius r extends around the predetermined picture element P0. Thereafter, the area of a center region Q0 which includes the predetermined picture element P0 is selected. Also, the area of peripheral regions Q1 are selected which peripheral regions respectively include picture elements Pi (i=1, 2, ..., 8) located at the intersections of the lines Li (i=1, 2, ..., 8) and the circle R. The radius r, the area of the center region Q0, and the areas and number of the peripheral regions Qi are selected appropriately in accordance with the size of the circular pattern which is to be detected, the level of accuracy required of the judgment, the speed with which the operations must be carried out, or the like. In the embodiments of FIG. 7, picture elements Pi are employed which are located at equal distances r from the predetermined picture element P0. Alternatively, the distances of the picture elements Pi from the predetermined picture element P0 may vary. For example, in cases where an elliptic pattern is to be detected whose long axis extends along the X direction in FIG. 7, picture elements, which are more remote from the predetermined picture element P0 than the picture elements P1 and P5, may be employed in lieu of the picture elements P1 and P5.

Thereafter, a calculation is made to find a mean-level value Q0 of the values of image signal components representing a plurality of picture elements, which are located in the center region Q0. Also, calculations are made to find mean-level values Qi, where i=1, 2, ..., 8, each representing the mean level of the values of image signal components representing a plurality of picture elements located in each of the peripheral regions Qi. As an aid in facilitating the explanation, Q0 represents both the center region and the mean-level value of the values of image signal components representing the picture elements, which are located in the center region. Also, Qi, where i=1, 2, ..., 8, represents both the peripheral regions and the mean-level values representing the mean level of the values of the image signal components representing the picture elements, which are located in each of the peripheral regions.

Thereafter, differences $\Delta i$, where i=1, 2, ..., 8, between the mean-level value Q0 corresponding to the center region and the respective mean-level values Qi corresponding to the peripheral regions are calculated from the formula $$\Delta i = Qi - Q0 \tag{6}$$

A first characteristic value, which is representative of the differences $\Delta i$, where i=1, 2, ..., 8, is then found. Also, a second characteristic value, which represents the amount of dispersion in the differences $\Delta i$, where i=1, 2, ..., 8, is found. In the embodiments, the mean value of the differences Wi is calculated from the formula $$\Delta = \frac{1}{8} \sum_{i=1}^{8} \Delta i$$

and employed as the first characteristic value. Also, the variance of the differences $\Delta i$ is calculated with the formula $$\sigma^2 = \frac{1}{8} \sum_{i=1}^{8} (\Delta i - \Delta)^2$$

and employed as the second characteristic value.

The ratio C1 of the mean value $\Delta$ to the variance $\rho^2$ is then calculated with the formula $$C1 = \frac{\Delta}{\sigma^2} \tag{7}$$

Thereafter, the ratio C1 is compared with a predetermined threshold value Th1. In cases where $C1 \geq Th1$, because the means value $\Delta$ is comparatively large and the variance $\rho^2$ is comparatively small, it is judged that the predetermined picture element P0 falls within the region corresponding to the tumor image. In cases where $C1 < Th1$, it is judged that the predetermined picture element P0 is located in the area outside of the tumor image.

Figure 8:
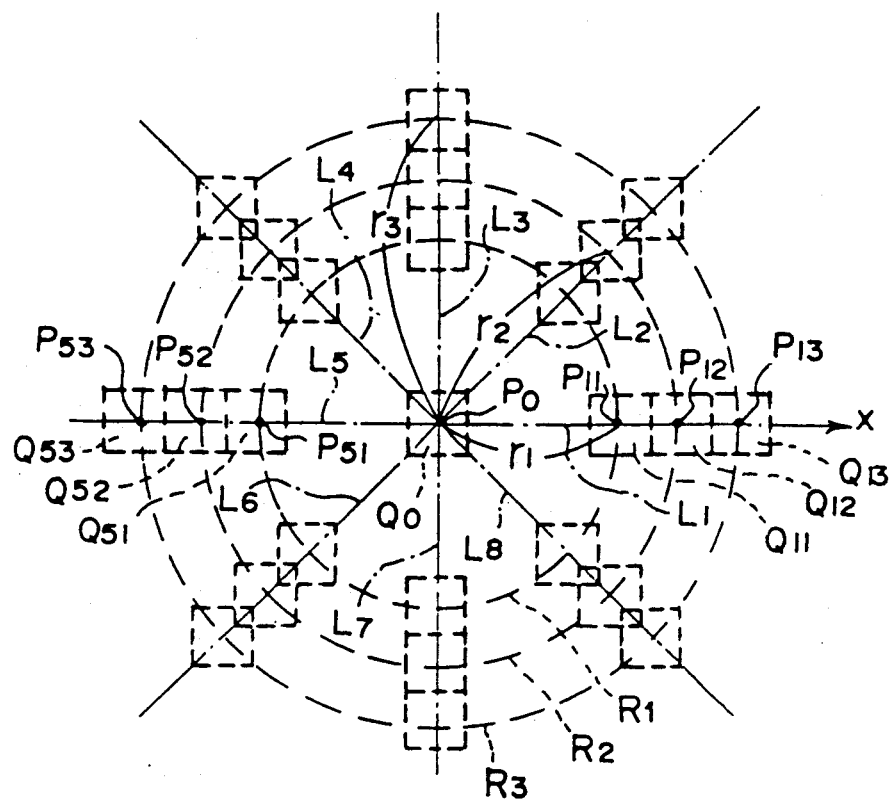
FIG. 8 is a diagram having a predetermined picture element P0 from an X-ray image in the middle, which diagram serves as an aid in explaining how a spatial-domain filter works, the spatial-domain filter being employed to detect a circular tumor image in embodiments of the fifth method and apparatus for classifying picture elements in accordance with the present invention.

FIG. 8 is a diagram having a predetermined picture element P0 from an X-ray image in the middle, which diagram serves as an aid in explaining how a spatial-domain filter works, the spatial-domain filter being employed to detect a circular tumor image in the embodiments of the fifth method and apparatus for classifying picture elements as belonging to or not belonging to a circular pattern in accordance with the present invention. As shown in FIG. 8, a plurality of (in this case, eight) imaginary lines Li, where i=1, 2, ..., 8, extend from the predetermined picture element P0 in the X-ray image to the peripheral parts of the X-ray image. Also, three imaginary circles Rj, where j=1, 2, 3, which have radii r1, r2, and r3, extend around the predetermined picture element P0. Thereafter, the area of a center region Q0 including the predetermined picture element P0 is selected. Also, the areas of the peripheral regions Qij, where i=1, 2, ..., 8, and j=1, 2, 3, are selected for each of the lines Li. Each of the peripheral regions Qij includes one of a plurality of picture elements Pij, which are located at the intersections of each of the lines Li and the circles Rj. (In FIG. 8, P11, P12, and P13 denote the picture elements located at the intersections of a line L1 and circles R1, R2, and R3. Also, P51, P52, and P53 denote the picture elements located at the intersections of a line L5 and the circles R1, R2, and R3. Further, Q11, Q12, Q13, Q51, Q52, and Q53 denote the peripheral regions which respectively include the picture elements P11, P12, P13, P51, P52, and P53.)

Thereafter, a calculation is made to find a mean-level value Q0 of the values of image signal components representing a plurality of picture elements, which are located in the center region Q0. Also, calculations are made to find mean-level values Qij, where i=1, 2, ..., 8, and j=1, 2, 3, each representing the mean level of the values of image signal components representing a plurality of picture elements located in each of the peripheral regions Qij, where i=1, 2, ..., 8, and j=1, 2, 3. As an aid in facilitating the explanation, Q0 represents both the center region and the mean-level value of the values of image signal components representing the picture elements, which are located in the center region. Also, Qij, where i=1, 2, ..., 8, and j=1, 2, 3, represents both the peripheral regions and the mean-level values representing the mean level of the values of the image signal components representing the picture elements, which are located in each of the peripheral regions.

Thereafter, differences $\Delta ij$, where i=1, 2, ..., 8 and j=1, 2, 3, between the mean-level value Q0 corresponding to the center region and the respective mean-level values Qij corresponding to the peripheral regions are calculated from the formula $$\Delta ij = Qij - Q0 \tag{8}$$

For each of the lines Li, the maximum value Δi of the differences Δij is then found. In the embodiments of the fifth method and apparatus for classifying picture elements in accordance with the present invention, the maximum value Δi thus found is employed as the representative value.

A first characteristic value U is then found, which is representative of the maximum value Δi, where i=1, 2, ..., 8, which have been found for the plurality of the lines Li. Also, a second characteristic value V is found, which represents the amount of dispersion in the maximum values Δi, where i=1, 2, ..., 8. For this purpose, first, characteristic values U1, U2, U3, and U4, and characteristic values V1, V2, V3, and V4 are calculated from the formulas $$U1 = (\Delta 1 + \Delta 2 + \Delta 5 + \Delta 6)/4 \quad (9)$$
$$U2 = (\Delta 2 + \Delta 3 + \Delta 6 + \Delta 7)/4 \quad (10)$$
$$U3 = (\Delta 3 + \Delta 4 + \Delta 7 + \Delta 8)/4 \quad (11)$$
$$U4 = (\Delta 4 + \Delta 5 + \Delta 8 + \Delta 1)/4 \quad (12)$$
$$V1 = U1/U3 \quad (13)$$
$$V2 = U2/U4 \quad (14)$$
$$V3 = U3/U1 \quad (15)$$
$$V4 = U4/U2 \quad (16)$$

By way of example, the process for calculating the characteristic value U1 from Formula (9) has the effects described below. Specifically, the addition of the maximum values corresponding to two adjacent groups of peripheral regions, which are located on the same side with respect to the predetermined picture element P0, (i.e. the addition of Δ1 and Δ2, or the addition of Δ5 and Δ6) corresponds to a smoothing process. Also, the maximum values corresponding to peripheral regions, which are located on opposite sides with respect to the predetermined picture element P0, are added together (in the case of Formula (9), the sum of Δ1 and Δ2 and the sum of Δ5 and Δ6 are added together). Such an addition is carried out in order that a tumor image can be detected even when, for example, it is present in a region wherein the background image density changes supply.

As for the calculation of the characteristic value V1 from Formula (13), the characteristic values U1 and U3 represent characteristics of the image in directions which are perpendicular to each other. Therefore, in cases where the shape of the tumor image is circular in FIG. 8, V1 will be approximately equal to 1.0. In cases where the predetermined picture element P0 is present in a linear image, such as a rib image, V1 will not be equal to 1.0.

As the first characteristic value U, which is representative of the maximum values Δi, where i=1, 2, ..., 8, of the aforesaid differences, the maximum value of the characteristic values U1, U2, U3, and U4, i.e.

$$U = MAX(U1, U2, U3, U4) \quad (17)$$

is employed. Also, as the second characteristic value V, which represents the amount of dispersion in the maximum values Δi, where i=1, 2, ..., 8, of the aforesaid differences, the maximum value of the characteristic values V1, V2, V3, and V4, i.e.

$$V = MAX(V1, V2, V3, V4) \quad (18)$$

is employed. After the first characteristic value U and the second characteristic value V have been found in the manner described above, a characteristic value C2 is calculated and then used during the judgment as to whether a predetermined picture element P0 falls or does not fall within the region corresponding to the tumor image. As the characteristic value C2, the ratio of the first characteristic value U to the second characteristic value V is employed, which is expressed as $$C2 = \frac{U}{V} \quad (19)$$

The characteristic value C2 is then compared with a predetermined threshold value Th2. From whether C2≧Th2 or C2<Th2, the judgment is made as to whether the predetermined picture element P0 falls or does not fall within the region corresponding to the tumor image.

As described above, in the apparatus for classifying picture elements, which apparatus is incorporated in the computer system 40 shown in FIG. 5, the image signal representing the X-ray image is processed with the spatial-domain filter, and a circular pattern, which is considered to be a tumor image, is detected.

In the embodiments of the fourth method and apparatus for classifying picture elements in accordance with the present invention, as shown in FIG. 7, the mean-level values Qi are used, each of which represents the mean level of the values of image signal components representing a plurality of the picture elements located in each of the peripheral regions Qi. Each of the peripheral regions Qi includes each of the picture elements Pi, which are located on eight lines, L1 through L8. Also, in the embodiments of the fifth method and apparatus for classifying picture elements in accordance with the present invention, as shown in FIG. 8, the mean-level values Qij are used, each of which represents the mean level of the values of image signal components representing a plurality of the picture elements located in each of the peripheral regions Qij. Each of the peripheral regions Qij includes one of the picture elements Pij, which are located on each of eight lines, L1 through L8. However, the number of the lines Li is not limited to eight, but may, for example, be 16. Also, in the embodiments of the fifth method and apparatus for classifying picture elements in accordance with the present invention, the distances from the predetermined picture element P0 are not limited to the three distances (r1, r2, and r3 in FIG. 8). For example, in order for tumor images having various sizes to be detected more accurately, operations may be carried out for a plurality of distances which vary approximately continuously between the distance r1 and the distance r3.

In the embodiments of the first to fifth methods and the first to fifth apparatuses for classifying picture elements in accordance with the present invention, which have been described above with reference to FIGS. 1 through 9, from an X-ray image of the chest or the mamma of a human body, which image has been stored on a stimulable phosphor sheet, a tumor image is detected which appears, typically, as a circular pattern on the X-ray image. However, the first to fifth methods and the first to fifth apparatuses for classifying picture elements in accordance with the present invention are not limited to the detection of a tumor image nor to the processing of X-ray images of chests or mammae. Also, recording media other than stimulable phosphor sheets may be used. The first to fifth methods and the first to fifth apparatuses for classifying picture elements in accordance with the present invention are applicable widely when, from an image signal representing a radiation image of an object, judgments are made as to whether predetermined picture elements in the radiation image fall or do not fall within the region corresponding to a circular pattern in the radiation image.

The fourth method and apparatus and the fifth method and apparatus for classifying picture elements in accordance with the present invention may be modified such that the peripheral regions which are relatively remote from a predetermined picture element have larger areas.

Further embodiments of the method and apparatus for classifying picture elements in accordance with the present invention will be described hereinbelow. In the embodiments, an X-ray image is stored on a stimulable phosphor sheet in the manner shown in FIG. 4, and an image of a tumor, which typically has an approximately spherical shape in the lungs of a human body, is detected from the X-ray image. In an apparatus for classifying picture elements as belonging to or not belonging to a pattern, which apparatus is incorporated in the computer system 40 shown in FIG. 5, a judgment is made in the manner described below as to whether a predetermined picture element P0 in the X-ray image falls or does not fall within the region corresponding to a tumor image (circular pattern) in the X-ray image.

Figure 10:
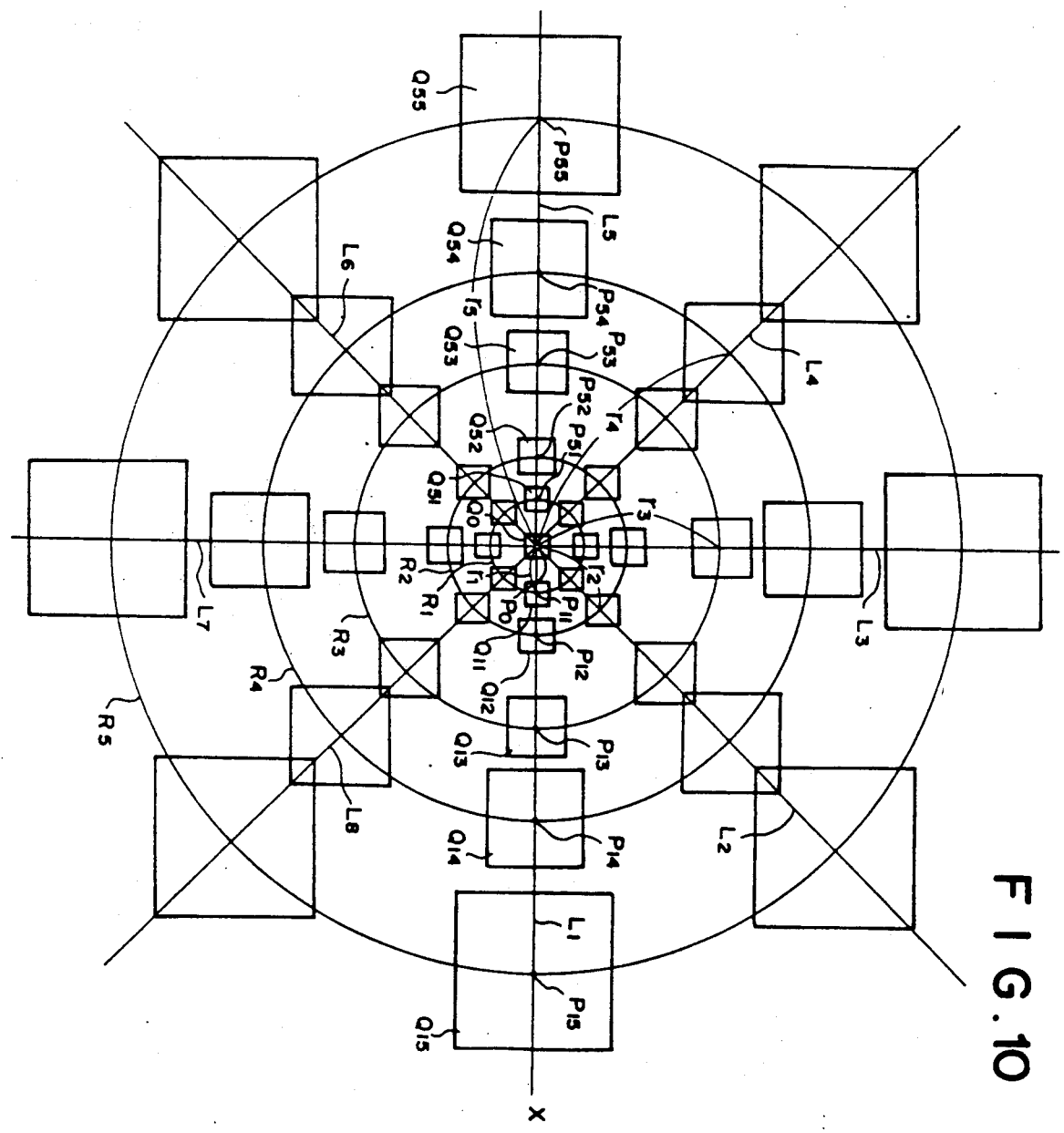
FIG. 10 is a diagram having a predetermined picture element P0 from an X-ray image in the middle, which diagram serves as an aid in explaining how a spatial-domain filter works, the spatial-domain filter being employed to detect a tumor image in embodiments of the method and apparatus for classifying picture elements in accordance with the present invention.

FIG. 10 is a diagram having a predetermined picture element P0 from an X-ray image in the middle, which diagram serves as an aid in explaining how a spatial-domain filter works, the spatial-domain filter being employed to detect a circular tumor image in the embodiments of the method and apparatus for classifying picture elements as belonging to or not belonging to a pattern in accordance with the present invention. A judgment is made as to whether a predetermined picture element P0 in the X-ray image falls or does not fall within the region corresponding to the tumor image in the X-ray image. The tumor image in the X-ray image can be detected by processing the image signal components representing the picture elements in the X-ray image with the filter illustrated in FIG. 10.

Figure 11:
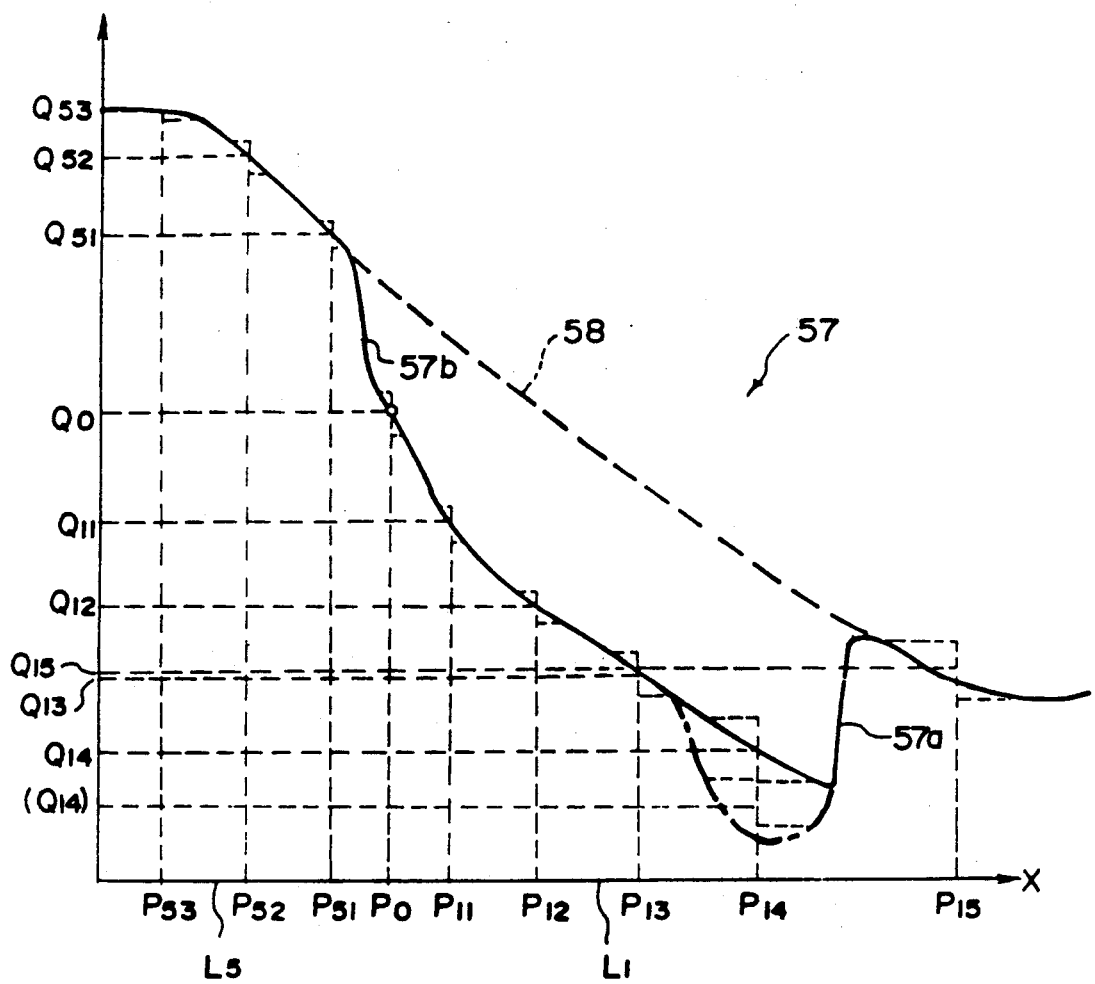
FIG. 11 is a graph showing an example of the profile of an X-ray image around a predetermined picture element P0 in the direction (x direction) along which the lines L1 and L5 shown in FIG. 10 extend.

FIG. 11 is a graph showing an example of the profile of the X-ray image around a predetermined picture element P0 in the direction (x direction) along which the lines L1 and L5 shown in FIG. 10 extend. In this example, the predetermined picture element P0 is located in a tumor image 57, which is present in the region of the X-ray image at which the image density (the value of the image signal representing the X-ray image) changes sharply. The predetermined picture element P0 is present in the vicinity of a boundary line 57b of the tumor image 57. Typically, the profile of a tumor image (i.e. the distribution of the values of image signal components representing the tumor image) is approximately symmetric bilaterally. However, in cases where, for example, the tumor image 57 is present in a region of the X-ray image at which the image density changes sharply as in the example illustrated, the profile of the tumor image 57 will often not be symmetric bilaterally. It is important that the tumor image 57 can be detected even in such cases.

As shown in FIG. 10, a plurality of (in this case, eight) imaginary lines Li, where i=1, 2, ..., 8, extend from the predetermined picture element P0 in the X-ray image to the peripheral parts of the X-ray image. Also, five imaginary circles Rj, where j=1, 2, 3, 4, 5, which have radii r1, r2, r3, r4, and r5, extend around the predetermined picture element P0. Thereafter, the area of a center region Q0 including the predetermined picture element P0 is selected. Also, the areas of peripheral regions Qij, where i=1, 2, ..., 8 and j=1, 2, 3, 4, 5, are selected for each of the lines Li. Each of the peripheral regions Qij includes one of a plurality of picture elements Pij, which are located at the intersections of each of the lines Li and the circles Rj. (In FIG. 10, P11, P12, P13, P14, and P15 denote the picture elements located at the intersections of a line L1 and circles R1, R2, R3, R4, and R5. Also, P51, P52, P53, P54, and P55 denote the picture elements located at the intersections of a line L5 and the circles R1, R2, R3, R4, and R5. Further, Q11, Q12, Q13, Q14, Q15, Q51, Q52, Q53, Q54, and Q55 denote the peripheral regions which respectively include the picture elements P11, P12, P13, P14, P15, P51, P52, P53, P54, and P55.) As illustrated in FIG. 10, the peripheral regions Qij which are more remote from the predetermined picture element P0 (i.e. the peripheral regions Qij having a larger value of j) are assigned larger areas.

Thereafter, a calculation is made to find a mean-level value Q0 of the values of image signal components representing a plurality of picture elements, which are located in the center region Q0. Also, calculations are made to find mean-level values Qij, where i=1, 2, ..., 8 and j=1, 2, 3, 4, 5, each representing the mean level of the values of image signal components representing a plurality of picture elements located in each of the peripheral regions Qij, where i=1, 2, ..., 8 and j=1, 2, 3, 4, 5. As an aid in facilitating the explanation, Q0 represents both the center region and the mean-level value of the values of image signal components representing the picture elements, which are located in the center region. Also, Qij, where i=1, 2, ..., 8 and j=1, 2, 3, 4, 5, represents both the peripheral regions and the mean-level values representing the mean level of the values of the image signal components representing the picture elements, which are located in each of the peripheral regions.

Thereafter, from the mean-level value Q0 corresponding to the center region and the mean-level values Qij, where i=1, 2, ..., 8 and j=1, 2, 3, 4, 5, corresponding to the peripheral regions, the differences $\Delta ij$ between the mean-level values corresponding to adjacent peripheral regions are calculated from the formulas $$\left.\begin{array}{l}\Delta i1 = Qi1 - Q0, \\ \Delta ij = Qij - Qi,j-1 \\ (j = 2,3,4,5)\end{array}\right\} \quad (20)$$

For each of the lines Li, the maximum value Ci of the differences $\Delta ij$ is then found. In the embodiments of this method and apparatus for classifying picture elements in accordance with the present invention, the maximum value Ci thus found is employed as the characteristic value Ci. Specifically, for the line L1, the maximum value C1 is found from the differences expressed as $$\Delta 11 = Q11 - Q0 \quad (21)$$
$$\Delta 12 = Q12 - Q11 \quad (22)$$
$$\Delta 13 = Q13 - Q12 \quad (23)$$
$$\Delta 14 = Q14 - Q13 \quad (24)$$
$$\Delta 15 = Q15 - Q14 \quad (25)$$

In the example of FIG. 11, $\Delta 11, \Delta 12, \Delta 13, \Delta 14 < 0$, and $\Delta 15 > 0$. Therefore, $\Delta 15$ is found as the maximum value C1.

However, as for the part of the image pattern indicated by the single-dot chained line in FIG. 11, $\Delta 14 = Q14 - Q13 < d$, where d denotes a predetermined threshold value, and $\Delta 14$ is thus very small. In such cases, it is regarded that a boundary between the tumor image and the image of a different object (e.g. a rib image) is present in the vicinity of the picture element P13. Therefore, the maximum value of $\Delta 11, \Delta 12$, and {13 is assigned as the characteristic value C1. Even when $\Delta 11, \Delta 12$, and $\Delta 13$ are less than $\Delta 15$, $\Delta 15$ is ignored.

For the line L5, the maximum value C5 is found from the differences expressed as $$\Delta 51 = Q51 - Q0 \quad (26)$$
$$\Delta 52 = Q52 - Q51 \quad (27)$$
$$\Delta 53 = Q53 - Q52 \quad (28)$$
$$\Delta 54 = Q54 - Q53 \quad (29)$$
$$\Delta 55 = Q55 - Q54 \quad (30)$$

In the example of FIG. 11, $\Delta 51$ is greater than $\Delta 52, \Delta 53, \Delta 54$, and $\Delta 55$. (Though Q54 and Q55 are not shown in FIG. 11, assume that $\Delta 54$ and $\Delta 55$ are small.) Therefore, $\Delta 51$ is found to be the maximum value C5.

In the embodiments of the method and apparatus for classifying picture elements in accordance with the present invention, the differences $\Delta ij$ between the mean-level values corresponding to adjacent peripheral regions are calculated from Formula (20). Alternatively, the differences between the mean-level value Q0 corresponding to the center region and the mean-level values Qij corresponding to the peripheral regions may be calculated from the formula $$\Delta ij' = Qij - Q0 \quad (20)$$

However, in cases where, as shown in FIG. 11, the tumor image 57 is present in a region in which the image density changes sharply, when the differences $\Delta ij'$ between the mean-level value Q0 corresponding to the center region and the mean-level values Qij corresponding to the peripheral regions are used, the effects of the sharp change in the image density in said region are superposed upon the change in the image density due to the tumor image 57. Therefore, the amount of information about the change in the image density due to the tumor image 57 is reduced, and the accuracy with which the tumor image 57 is detected becomes low. In the embodiments of the method and apparatus for classifying picture elements in accordance with the present invention, because the differences between the mean-level values corresponding to adjacent peripheral regions are calculated from Formula (20), the effects of the sharp change in the image density in the region in which the tumor image 57 is present can be minimized, and the accuracy with which the tumor image 57 is detected (i.e. the accuracy with which the judgment is made as to whether a predetermined picture element P0 falls or does not fall in the region corresponding to the tumor image 57) becomes high.

Each of the mean-level values Q14 and Q15, from which the maximum value C1 is calculated with Formula (25), represents the mean level of the values of the image signal components corresponding to the picture elements located in peripheral regions having a large area. Therefore, the judgment as to whether a predetermined picture element P0 falls or does not fall within the region corresponding to the tumor image 57 can be made without being adversely affected by noise, which is generally included in the image signal representing the X-ray image. As for the position of the boundary line 57a of the tumor image 57, only vague information can be obtained. Specifically, it can be detected only that the boundary line 57a is present somewhere between the two peripheral regions Q14 and Q15 both of which have large areas. However, as shown in FIG. 11, the predetermined picture element P0 is present in the vicinity of the boundary line 57b and is remote from the boundary line 57a. Therefore, as for the position of the boundary line 57a, it is sufficient to determine that it is present. Accordingly, peripheral regions having as large an area as possible should preferably be employed, provided that the presence of the boundary line 57a can be detected.

Each of the mean-level values Q0 and Q51, from which the maximum value C5 is calculated with Formula (26), represents the mean level of the values of the image signal components corresponding to the picture elements located in a region having a small area. Therefore, the position of the boundary line 57b can be detected accurately. In such cases, because the mean-level values corresponding to regions having small areas are used, adverse effects occur from noise. However, with the whole filter employed in the embodiments of the method and apparatus for classifying picture elements in accordance with the present invention, mean-level values corresponding to peripheral regions having large areas, like the peripheral regions Q14 and Q15, are also used. Accordingly, the adverse effects from noise can be sufficiently suppressed.

Figure 12:
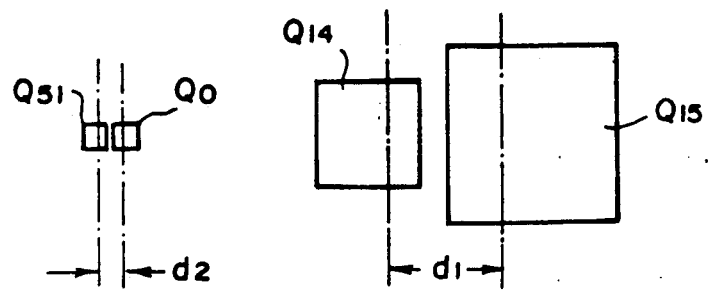
FIG. 12 is an explanatory view showing the relationship between the areas of regions used during calculations and the accuracy with which the position of a boundary line of a tumor image can be detected.

FIG. 12 is an explanatory view showing the relationship between the areas of regions used during calculations and the accuracy with which the position of a boundary line of a tumor image can be detected.

The position of the boundary line 57a is detected from the mean-level values corresponding to the two peripheral regions Q14 and Q15, which have large areas. Therefore, it cannot be detected accurately at which position in the width d1 shown in FIG. 12 the boundary line 57a is present. However, the position of the boundary line 57b is detected from the mean-level values corresponding to the two regions Q0 and Q51, which have small areas. Therefore, the position of the boundary line 57b can be detected with a high accuracy because it falls somewhere within the width d2 shown in FIG. 12.

After, the maximum values Ci are found for the plurality of the lines Li, calculations are made to find the mean-level value, for example, the mean value, of two maximum values, which have been found for each set of two lines extending from the predetermined picture element P0 in opposite directions. Specifically, mean values M15, M26, M37, and M48 are calculated respectively for the set of lines L1 and L5, the set of lines L2 and L6, the set of lines L3 and L7, and the set of lines L4 and L8. For the set of lines L1 and L5, the mean value M15 is calculated from the formula $$M15 = \frac{C1 + C5}{2} \qquad (31)$$

As described above, two lines extending from the predetermined picture element P0 in opposite directions are grouped into a single set. Therefore, a tumor image can be detected accurately even when, as shown in FIG. 11, the tumor image 57 is present in a region in which the background image density changes sharply and the distribution of the values of the image signal components representing the tumor image 57 is asymmetric.

From the mean values M15, M26, M37, and M48, which have been calculated in the manner described above, a judgment is made as to whether a predetermined picture element P0 falls or does not fall within the region corresponding to the tumor image. In the method and apparatus for classifying picture elements as belonging to or not belonging to a pattern in accordance with the present invention, no limitation is imposed on how the judgment is made from the mean values M15, M26, M37, and M48. By way of example, the judgment may be made in the manner described below.

How a characteristic value C is determined, which is used during the judgment as to whether a predetermined picture element P0 falls or does not fall within the region corresponding to the tumor image, will be described hereinbelow with reference to FIG. 3. In FIG. 3, the horizontal axis represents the mean values M15, M26, M37, and M48, which have been calculated in the manner described above. The vertical axis represents rating values C15, C26, C37, and C48, which correspond respectively to the mean values M15, M26, M37, and M48.

A rating value of zero is assigned to the mean values M15, M26, M37, and M48 in cases where they are smaller than a certain value M1. A rating value of 1.0 is assigned to the mean values M15, M26, M37, and M48 in cases where they are larger than a certain value M2. In cases where the mean values M15, M26, M37, and M48 fall within the range of M1 to M2, a rating value falling within the range of 0.0 to 1.0 is assigned to the mean values M15, M26, M37, and M48, depending upon their values. In this manner, the rating values C15, C26, C37, and C48 are found, which correspond respectively to the mean values M15, M26, M37, and M48. The sum of the rating values C15, C26, C37, and C48, which is expressed as $$C = C15 + C26 + C37 + C48 \qquad (32)$$

is taken as the characteristic value C. The characteristic value C will fall within the range of a minimum value 0.0 to a maximum value 4.0.

The characteristic value C is then compared with a predetermined threshold value Th. From whether $C \geq Th$ or $C < Th$, the judgment is made as to whether the predetermined picture element P0 falls or does not fall within the region corresponding to the tumor image.

In cases where the rating values C15, C26, C37, and C48 are calculated from an equation such as the one, represented by the single-dot chained line in FIG. 3, wherein saturation occurs at a small value, e.g. M2', the characteristic value C calculated from Formula (32) will take a larger value in cases where the shape of the tumor image is closer to a circle. In cases where the rating values C15, C26, C37, and C48 are calculated from an equation such as the one represented by the double-dot chained line in FIG. 3, wherein saturation occurs at a large value, e.g. M2", the characteristic value C calculated from Formula (32) will take a larger value in cases where the contrast of the tumor image with respect to the surrounding image regions is higher. Therefore, an appropriate equation for transforming the mean values into rating values can be selected in accordance with the characteristics of the tumor image which is to be found.

The process of making the judgment from the mean values M15, M26, M37, and M48 is not limited to using the characteristic value C and may be carried out in various other manners. For example, the mean values M15, M26, M37, and M48 may be compared with a threshold value Th'. In cases where all of the mean values M15, M26, M37, and M48 are larger than the threshold value Th', it may be judged that the predetermined picture element P0 falls within the region corresponding to the tumor image. Alternatively, in cases where at least three of the mean values M15, M26, M37, and M48 are larger than the threshold value Th', it may be judged that the predetermined picture element P0 falls within the region corresponding to the tumor image. As another alternative, the sum, $NM = M15 + M26 + M37 + M48$, of the mean values M15, M26, M37, and M48 may be calculated and compared with a threshold value Th". In cases where $M \geq Th"$, it may be judged that the predetermined picture element P0 falls within the region corresponding to the tumor image.

In the embodiments of the method and apparatus for classifying picture elements in accordance with the present invention, which have been described above with reference to FIGS. 10, 11, and 12, from an X-ray image of the chest of a human body, which image has been stored on a stimulable phosphor sheet, a tumor image is detected which appears, typically, as a circular pattern on the X-ray image. However, the method and apparatus for classifying picture elements in accordance with the present invention are not limited to the detection of a tumor image nor to the processing of an X-ray image of a chest. For example, the method and apparatus for classifying picture elements in accordance with the present invention is also applicable when an image of a calcified part is to be detected from an image of a mamma. Further, the method and apparatus for classifying picture elements in accordance with the present invention are not limited to the detection of circular patterns. For example, instead of the characteristic value C being calculated with Formula (32), a characteristic value C', which is weighted for a specific direction, may be calculated from the formula $$C' = (5 \cdot C15 + C26 + C37 + C48)/2 \qquad (32)'$$

In such cases, a linear pattern, such as a rib image or a blood vessel image, can be detected.

The method and apparatus for classifying picture elements as belonging to or not belonging to a pattern in accordance with the present invention is also applicable when a recording medium other than a stimulable phosphor sheet, for example, X-ray film, is used.

In the aforesaid embodiments of the method and apparatus for classifying picture elements in accordance with the present invention, as shown in FIG. 10, the mean-level values Qij are used, each of which represents the mean level of the values of image signal components representing a plurality of picture elements located in each of the peripheral regions Qij. Each of the peripheral regions Qij includes one of a plurality of picture elements Pij, which are located on each of eight lines, L1 through L8. However, the number of lines Li is not limited to eight, but may, for example, be 16. Also, the distances from the predetermined picture element P0 are not limited to the five distances (r1, r2, r3, r4, and r5).

As described above, the method and apparatus for classifying picture elements in accordance with the present invention are applicable widely when, from an image signal representing a radiation image of an object, a judgment is made as to whether a predetermined picture element P0 in the radiation image falls or does not fall within the region corresponding to a predetermined pattern in the radiation image.

In the first to fifth methods and the first to fifth apparatuses for classifying picture elements in accordance with the present invention and in the other method and apparatus for classifying picture elements in accordance with the present invention, the image signal representing a radiation image need not necessarily be processed with the filter described above. For example, an operator may manually designate a predetermined point in the radiation image and may judge whether the predetermined point falls or does not fall in the region corresponding to a predetermined pattern.

What is claimed is:

1. A method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, p1 the method for classifying picture elements comprising the steps of:

(i) calculating the differences, $\Delta ij = fij - f0$, between the value of an image signal component f0 representing a predetermined picture element P0 and the values of respective image signal components fij representing respective picture elements Pij, which are located on respective ones of a plurality of lines Li, where i = 1, 2, ..., n, extending from said predetermined picture element P0 to a peripheral parts of said radiation image, and which are spaced a plurality of predetermined distances rij, where j = 1, 2, ..., m, from said predetermined picture element P0, (ii) finding a respective value, which is representative of said differences $\Delta ij$, for each of said lines Li, (iii) calculating a mean-level value of two said representative values for each of a plurality of sets of two said lines which extend from said predetermined picture element P0 in approximately opposite directions, and (iv) from the mean-level values, which have been calculated for a plurality of said set of lines, judging whether said predetermined picture element P0 falls or does not fall within the region corresponding to said circular pattern.

2. A method for classifying picture elements as defined in claim 1 wherein said representative value is the maximum value of said differences $\Delta ij$, which have been found for each of said lines Li.

3. A method for classifying picture elements as defined in claim 1 wherein said representative value is the minimum value of said differences $\Delta ij$, which have been found for each of said lines Li.

4. A method for classifying picture elements as defined in claim 1 wherein said radiation image of the object has been stored on a stimulable phosphor sheet.

5. A method for classifying picture elements as defined in claim 4 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

6. A method for classifying picture elements as defined in claim 5 wherein said stimulating rays are a laser beam.

7. A method for classifying picture elements as defined in claim 1 wherein said radiation image of the object has been recorded on photographic film.

8. An apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a difference calculating means for calculating the differences, $\Delta ij = fij - f0$, between the value of an image signal component f0 representing a predetermined picture element P0 and the values of respective image signal components fij representing respective picture elements Pij, which are located on respective ones of a plurality of lines Li, where i = 1, 2, ..., n, extending from said predetermined picture element P0 to peripheral parts of said radiation image, and which are spaced a plurality of predetermined distances rij, where j = 1, 2, ..., m, from said predetermined picture element P0, (ii) a representative value calculating means for finding a representative value, which is representative of said differences $\Delta ij$, for each of said lines Li, (iii) a mean calculating means for calculating a mean-level value of two said representative values for each of a plurality of sets of two said lines which extend from said predetermined picture elements P0 in approximately opposite directions, and (iv) a judgment means for judging, from the mean-level values, which have been calculated for a plurality of said sets of lines, whether said predetermined picture element P0 falls or does not fall within the region corresponding to said circular pattern.

9. An apparatus for classifying picture elements as defined in claim 8 wherein said representative value is the maximum value of said differences $\Delta ij$, which have been found for each of said lines Li.

10. An apparatus for classifying picture elements as defined in claim 8 wherein said representative value is the minimum value of said differences $\Delta ij$, which have been found for each of said lines Li.

11. An apparatus for classifying picture elements as defined in claim 8 wherein said radiation image of the object has been stored on a stimulable phosphor sheet.

12. An apparatus for classifying picture elements as defined in claim 11 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

13. An apparatus for classifying picture elements as defined in claim 12 wherein said stimulating rays are a laser beam.

14. An apparatus for classifying picture elements as defined in claim 8 wherein said radiation image of the object has been recorded on photographic film.

15. A method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:
(i) calculating the gradients $\nabla fi$ of image signal components fi representing the picture elements Pi, which are located on a plurality of lines Li, where $i = 1, 2, \ldots, n$, extending from a predetermined picture element P0 to peripheral parts of said radiation image, and which are spaced a predetermined distance ri from said predetermined picture element P0,
(ii) calculating the normalized gradients $\nabla fi/|\nabla fi|$ by dividing the gradients $\nabla fi$ by their magnitudes $|\nabla fi|$,
(iii) calculating the projections of said normalized gradients $\nabla fi/|\nabla fi|$ on the vectors directed from said picture elements Pi to said predetermined picture element P0, the projections being expressed as $\nabla fi/|\nabla fi|*ei$, where ei denotes the unit vectors directed from said picture elements Pi to said predetermined picture element P0, and * denotes the inner product,
(iv) calculating a mean-level value from the values of said projections $\nabla fi/|\nabla fi|*ei$, and
(v) from said mean-level value, judging whether said predetermined picture element P0 falls or does not fall within the region corresponding to said circular pattern.

16. A method for classifying picture elements as defined in claim 15 wherein said radiation image of the object has been stored on a stimulable phosphor sheet.

17. A method for classifying picture elements as defined in claim 16 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

18. A method for classifying picture elements as defined in claim 17 wherein said stimulating rays are a laser beam.

19. A method for classifying picture elements as defined in claim 15 wherein said radiation image of the object has been recorded on photographic film.

20. A method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:
(i) calculating the gradients $\nabla fij$ of respective image signal components fij representing respective picture elements Pij, which are located on respective ones of a plurality of lines Li, where $i = 1, 2, \ldots, n$, extending from a predetermined picture element P0 to peripheral parts of said radiation image, and which are spaced a plurality of predetermined distances rij, where $j = 1, 2, \ldots, m$, from said predetermined picture element P0,
(ii) calculating the normalized gradients $\nabla fij/|\nabla fij|$ by dividing the gradients $\nabla fij$ by their magnitudes $|\nabla fij|$,
(iii) calculating the projections of said normalized gradients $\nabla fij/|\nabla fij|$ on vectors which are directed from said picture elements Pij to said predetermined picture element P0 the projections being expressed as $\nabla fij/|\nabla fij|*ei$, where ei denotes the unit vectors directed from said picture elements Pij to said predetermined picture element P0, and v denotes the inner product,
(iv) finding a representative value $\{\nabla fij/|\nabla fij|*ei\}r$, which is representative of said projections $\nabla fij/|\nabla fij|*ei$, for each of said lines Li,
(v) calculating a mean-level value of said representative values $\{\nabla fij/|\nabla fij|*ei\}r$, which have been found for the plurality of said lines Li, and
(vi) from said mean-level value, judging whether said predetermined picture element P0 falls or does not fall within the region corresponding to said circular pattern.

21. A method for classifying picture elements as defined in claim 20 wherein said representative value is the maximum value of said components $\nabla fij/|\nabla fij|*ei$, which have been found for each of said lines Li.

22. A method for classifying picture elements as defined in claim 20 wherein said representative value is the minimum value of said components $\nabla fij/|\nabla fij|*ei$, which have been found for each of said lines Li.

23. A method for classifying picture elements as defined in claim 20 wherein said radiation image of the object has been stored on a stimulable phosphor sheet.

24. A method for classifying picture elements as defined in claim 23 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

25. A method for classifying picture elements as defined in claim 24 wherein said stimulating rays are a laser beam.

26. A method for classifying picture elements as defined in claim 20 wherein said radiation image of the object has been recorded on photographic film.

27. An apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:
(i) a gradient calculating means for calculating the gradients $\nabla fi$ of image signal components fi representing the picture elements Pi, which are located on a plurality of lines Li, where $i = 1, 2, \ldots, n$, extending from a predetermined picture element P0 to the peripheral parts of said radiation image, and which are spaced a predetermined distance ri from said predetermined picture element P0,
(ii) a normalization means for calculating the normalized gradients $\nabla fi / |\nabla fi|$ by dividing the gradients $\nabla fi$ by their magnitudes $|\nabla fi|$,
(iii) an inner product calculating means for calculating the projections of said normalized gradients $\nabla fi / |\nabla fi|$ on vectors which are directed from said picture elements Pi to said predetermined picture element P0, the projections being expressed as $\nabla fi / |\nabla fi| * ei$, where ei denotes the unit vectors directed from said picture elements Pi to said predetermined picture element P0, and * denotes the inner product,
(iv) a mean calculating means for calculating a mean-level value of said projections $\nabla fi / |\nabla fi| * ei$, and
(v) a judgment means for judging, from said mean-level value, whether said predetermined picture element P0 falls or does not fall within the region corresponding to said circular pattern.

28. An apparatus for classifying picture elements in as defined in claim 27 wherein said radiation image of the object has been stored on a stimulable phosphor sheet.

29. An apparatus for classifying picture elements as defined in claim 28 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

30. An apparatus for classifying picture elements as defined in claim 29 wherein said stimulating rays are a laser beam.

31. An apparatus for classifying picture elements as defined in claim 27 wherein said radiation image of the object has been recorded on photographic film.

32. An apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:
(i) a gradient calculating means for calculating the gradients $\nabla fij$ of image signal components fij representing the picture elements Pij, which are located on each of a plurality of lines Li, where $i = 1, 2, \ldots, n$, extending from a predetermined picture element P0 to peripheral parts of said radiation image, and which are spaced a plurality of predetermined distances rij, where $j = 1, 2, \ldots, m$, from said predetermined picture element P0,
(ii) a normalization means for calculating the normalized gradients $\nabla fij / |\nabla fij|$ by dividing the gradients $\nabla fij$ by their magnitudes $|\nabla fij|$,
(iii) an inner product calculating means for calculating the projections of said normalized gradients $\nabla fij / |\nabla fij|$ on vectors which are directed from said picture elements Pij to said predetermined picture element P0, the projections being expressed as $\nabla fij / |\nabla fij| * ei$, where ei denotes the unit vectors directed from said picture elements Pij to said predetermined picture element P0, and denotes the inner product,
(iv) a representative value calculating means for finding a representative value $\{\nabla fij / |fij| * ei\}r$, which is representative of said projections $\nabla fij / |\nabla fij| * ei$, for each of said lines Li,
(v) a mean calculating means for calculating a mean-level value of said representative values $\{\nabla fij / |\nabla fij| * ei\}r$, which have been found for the plurality of said lines Li, and
(vi) a judgment means for judging, from said mean-level value, whether said predetermined picture element P0 falls or does not fall within the region corresponding to said circular pattern.

33. An apparatus for classifying picture elements as defined in claim 32 wherein said representative value is the maximum value of said components $\nabla fij / |\nabla fij| * ei$, which have been found for each of said lines Li.

34. An apparatus for classifying picture elements as defined in claim 32 wherein said representative value is the minimum value of said components $\nabla fij / |\nabla fij| * ei$, which have been found for each of said lines Li.

35. An apparatus for classifying picture elements as defined in claim 32 wherein said radiation image of the object has been stored on a stimulable phosphor sheet.

36. An apparatus for classifying picture elements as defined in claim 35 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

37. An apparatus for classifying picture elements as defined in claim 36 wherein said stimulating rays are a laser beam.

38. An apparatus for classifying picture elements as defined in claim 32 wherein said radiation image of the object has been recorded on photographic film.

39. A method for classifying picture elements as belonging to or not belonging to a circular pattern wherein, from an image signal made up of a series of image signal components representing a radiation image of an object, judgment are made as to whether predetermined picture elements in the radiation image fall or do not fall within the region corresponding to a circular pattern in the radiation image, the method for classifying picture elements comprising the steps of:
(i) calculating:
(a) a mean-level value Q0 from the values of image signal components representing a plurality of picture elements, which are located in a center region including a predetermined picture element P0, and
(b) mean-level values Qi, where i=1, 2, ..., n, each representing the mean level of the values of image signal components representing a plurality of picture elements, which are located in each of a plurality of peripheral regions surrounding said center region,
(ii) calculating the differences $\Delta i$, where i=1, 2, ..., n, between said mean-level value Q0 corresponding to said center region and the respective mean-level values Qi, where i=1, 2, ..., n, corresponding to said peripheral regions,
(iii) finding a first characteristic value, which is representative of said differences $\Delta i$, and a second characteristic value, which represents the amount of dispersion in said differences $\Delta i$,
(iv) calculating the ratio of said first characteristic value to said second characteristic value,
(v) comparing said ratio with a predetermined threshold value, and
(vi) from the results of the comparison, judging whether said predetermined picture element P0 falls or does not fall within the region inside of said circular pattern.

40. A method for classifying picture elements as defined in claim 39 wherein said first characteristic value is the mean-level value of said differences $\Delta i$.

41. A method for classifying picture elements as defined in claim 39 wherein said second characteristic value is the variance of said differences $\Delta i$.

42. A method for classifying picture elements as defined in claim 39 wherein said radiation image of the object has been stored on a stimulable phosphor sheet.

43. A method for classifying picture elements as defined in claim 42 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

44. A method for classifying picture elements as defined in claim 43 wherein said stimulating rays are a laser beam.

45. A method for classifying picture elements as defined in claim 39 wherein said radiation image of the object has been recorded on photographic film.

46. A method for classifying picture elements as defined in claim 39 wherein the peripheral regions which are more remote from said predetermined picture element P0 have larger areas.

47. A method for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the method for classifying picture elements comprising the steps of:
(i) calculating:
(a) a mean-level value Q0 of the values of image signal components representing a plurality of picture elements, which are located in a center region including a predetermined picture element P0, and
(b) mean-level values Qij, each representing the mean level of the values of image signal components representing a plurality of picture elements located in each of a plurality of peripheral regions, each said peripheral region including each of picture elements Pij, which are located on each of a plurality of lines Li, where i=1, 2, ..., n, extending from said predetermined picture element P0 to peripheral parts of said radiation image, and which are spaced a plurality of predetermined distances rij, where j=1, 2, ..., m, from said predetermined picture element P0,
(ii) finding a representative value Qi, which is representative of said mean-level values, for each of said lines Li,
(iii) calculating the differences $\Delta i$, where i=1, 2, ..., n, between said mean-level value Q0 corresponding to said center region and the respective representative values Qi, which have been found for the plurality of said lines Li,
(iv) finding a first characteristic value, which is representative of said differences $\Delta i$, and a second characteristic value, which represents the amount of dispersion in said differences $\Delta i$,
(v) calculating the ratio of said first characteristic value to said second characteristic value,
(iv) comparing said ration with a predetermined threshold value, and
(vii) from the results of the comparison, judging whether said predetermined picture element P0 falls or does not fall within the region corresponding to said circular pattern.

48. A method for classifying picture elements as defined in claim 47 wherein said representative value Qi is the maximum value of said mean-level values Qij corresponding to the peripheral regions located along each of said lines Li.

49. A method for classifying picture elements as defined in claim 47 wherein said representative value Qi is the minimum value of said mean-level values Qij corresponding to the peripheral regions located along each of said lines Li.

50. A method for classifying picture elements as defined in claim 47 wherein said radiation image of the object has been stored on a stimulable phosphor sheet.

51. A method for classifying picture elements as defined in claim 50 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

52. A method for classifying picture elements as defined in claim 51 wherein said stimulating rays are a laser beam.

53. A method for classifying picture elements as defined in claim 47 wherein said radiation image of the object has been recorded on photographic film.

54. A method for classifying picture elements as defined in claim 47 wherein the peripheral regions remoter from said predetermined picture element P0 have larger areas.

55. An apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a mean calculating means for calculating:
(a) a mean-level value Q0 of the values of image signal components representing a plurality of picture elements, which are located in a center region including a predetermined picture element P0, and
(b) mean-level values Qi, where i=1, 2, ..., n, each representing the mean level of the values of image signal components representing a plurality of picture elements, which are located in each of a plurality of peripheral regions surrounding said center region, (ii) a difference calculating means for calculating the differences Δi, where i=1, 2, ..., n, between said mean-level value Q0 corresponding to said center region and the respective mean-level values Qi, where i=1, 2, ..., n, corresponding to said peripheral regions, (iii) a characteristic value calculating means for finding a first characteristic value, which is representative of said differences Δi, and a second characteristic value, which represents the amount of dispersion in said differences Δi, (iv) a ratio calculating means for calculating the ratio of said first characteristic value to said second characteristic value, and (v) a judgment means which compares said ratio with a predetermined threshold value and judges, from the results of the comparison, whether said predetermined picture element P0 falls or does not fall within the region corresponding to said circular pattern.

56. An apparatus for classifying picture elements as defined in claim 55 wherein said first characteristic value is the mean-level value of said differences Δi.

57. An apparatus for classifying picture elements as defined in claim 55 wherein said second characteristic value is the variance of said differences Δi.

58. An apparatus for classifying picture elements as defined in claim 55 wherein said radiation image of the object has been stored on a stimulable phosphor sheet.

59. An apparatus for classifying picture elements as defined in claim 58 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

60. An apparatus for classifying picture elements as defined in claim 59 wherein said stimulating rays are a laser beam.

61. An apparatus for classifying picture elements as defined in claim 55 wherein said radiation image of the object has been recorded on photographic film.

62. An apparatus for classifying picture elements as defined in claim 55 wherein the peripheral regions which are more remote from said predetermined picture element P0 have larger areas.

63. An apparatus for classifying picture elements as belonging to or not belonging to a circular pattern wherein, from an image signal made up of a series of image signal components representing a radiation image of an object, judgments are made as to whether predetermined picture elements in the radiation image fall or do not fall within the region corresponding to a circular pattern in the radiation image, the apparatus for classifying picture elements comprising:

(i) a mean calculating means for calculating:
(a) a mean-level value Q0 of the values of image signal components representing a plurality of picture elements, which are located in a center region including a predetermined picture element P0, and
(b) mean-level values Qij, each representing the mean level of the values of image signal components representing a plurality of picture elements located in each of a plurality of peripheral regions, each said peripheral region including one of a plurality of picture elements Pij, which are located on each of a plurality of lines Li, where i=1, 2, ..., n, extending from said predetermined picture element P0 to the peripheral parts of said radiation image, and which picture elements Pij are spaced a plurality of predetermined distances rij, where j=1, 2, ..., m, from said predetermined picture element P0, (ii) a representative value calculating means for finding a representative value Qi, which is representative of said mean-level values, for each of said lines Li, (iii) a difference calculating means for calculating the differences Δi, where i=1, 2, ..., n, between said mean-level value Q0 corresponding to said center region and the respective representative values Qi, which have been found for the plurality of said lines Li, (iv) a characteristic value calculating means for finding a first characteristic value, which is representative of said differences Δi, and a second characteristic value, which represents the amount of dispersion in said differences Δi, (v) a ratio calculating means for calculating the ratio of said first characteristic value to said second characteristic value, and (vi) a judgment means which compares said ratio with a predetermined threshold value and judges, from the results of the comparison, whether said predetermined picture element P0 falls or does not fall within the region inside of said circular pattern.

64. An apparatus for classifying picture elements as defined in claim 63 wherein said representative value Qi is the maximum value of said mean-level values Qij corresponding to the peripheral regions located along each of said lines Li.

65. An apparatus for classifying picture elements as defined in claim 63 wherein said representative value Qi is the minimum value of said mean-level values Qij corresponding to the peripheral regions located along each of said lines Li.

66. An apparatus for classifying picture elements as defined in claim 63 wherein said radiation image of the object has been stored on a stimulable phosphor sheet.

67. An apparatus for classifying picture elements as defined in claim 66 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

68. An apparatus for classifying picture elements as defined in claim 67 wherein said stimulating rays are a laser beam.

69. An apparatus for classifying picture elements as defined in claim 63 wherein said radiation image of the object has been recorded on photographic film.

70. An apparatus for classifying picture elements as defined in claim 63 wherein the peripheral regions which are more remote from said predetermined picture element P0 have larger areas.

71. A method for classifying picture elements as belonging to or not belonging to a pattern wherein, from an image signal made up of a series of image signal components representing a radiation image of an object, judgments are made as to whether predetermined picture elements in the radiation image fall or do not fall within the region corresponding to a predetermined pattern in the radiation image,
the method for classifying picture elements comprising the steps of:
(i) calculating:
(a) the value Q0 of an image signal component representing a predetermined picture element P0, or a mean-level value Q0 of the values of image signal components representing a plurality of picture elements, which are located in a center region including said predetermined picture element P0, and
(b) mean-level values Qij, each representing the mean level of the values of image signal components representing a plurality of picture elements located in each of a plurality of peripheral regions, each said peripheral region including one of a plurality of picture elements Pij, which are located on each of a plurality of lines Li, where i=1, 2, ..., n, extending from said predetermined picture element P0 to peripheral parts of said radiation image, and which picture elements Pij are spaced a plurality of predetermined distances rij, where j=1, 2, ..., m, from said predetermined picture element P0, the areas of said peripheral regions being selected such that peripheral regions which are more remote from said predetermined picture element P0 have larger areas,
(ii) calculating a characteristic value Ci, which represents the change in said radiation image in the direction along which each of said lines Li extends, for each of said lines Li, and
(iii) from a plurality of the characteristic values Ci, which have been calculated for the plurality of directions along which said lines Li extend, judging whether said predetermined picture element P0 falls or does not fall within the region corresponding to said predetermined pattern.

72. A method for classifying picture elements as defined in claim 71 wherein said characteristic value Ci is the maximum value of differences between the mean-level values (Q0, Qij) corresponding to adjacent regions located along each of said lines Li.

73. A method for classifying picture elements as defined in claim 71 wherein said characteristic value Ci is the maximum value of differences between said mean-level value Q0 corresponding to said center region and the respective mean-level values Qij corresponding to the peripheral regions located along each of said lines Li.

74. A method for classifying picture elements as defined in claim 71 wherein said radiation image of the object has been stored on a stimulable phosphor sheet.

75. A method for classifying picture elements as defined in claim 74 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

76. A method for classifying picture elements as defined in claim 75 wherein said stimulating rays are a laser beam.

77. A method for classifying picture elements as defined in claim 71 wherein said radiation image of the object has been recorded on photographic film.

78. An apparatus for classifying picture elements as belonging to or not belonging to a pattern wherein, from an image signal made up of a series of image signal components representing a radiation image of an object, judgments are made as to whether predetermined picture elements in the radiation image fall or do not fall within the region corresponding to a predetermined pattern in the radiation image,
the apparatus for classifying picture elements comprising:
(i) a mean calculating means for calculating:
(a) the value Q0 of an image signal component representing a predetermined picture element P0, or a mean-level value Q0 of the values of image signal components representing a plurality of picture elements, which are located in a center region including said predetermined picture element P0, and
(b) mean-level values Qij, each representing the mean level of the values of image signal components representing a plurality of picture elements located in each of a plurality of peripheral regions, each said peripheral region including one of a plurality of picture elements Pij, which are located on each of a plurality of lines Li, where i=1, 2, ..., n, extending from said predetermined picture element P0 to the peripheral parts of said radiation image, and which pictures elements Pij are spaced a plurality of predetermined distances rij, where j=1, 2, ..., m, from said predetermined picture element P0, the areas of said peripheral regions being selected such that peripheral regions which are more remote from said predetermined picture element P0 have larger areas,
(ii) a characteristic value calculating means for calculating a characteristic value Ci, which represents the change in said radiation image in the direction along which each of said lines Li extends, for each of said lines Li, and
(iii) a judgment means for judging, from a plurality of the characteristic values Ci, which have been calculated for the plurality of directions along which said lines Li extend, whether said predetermined picture element P0 falls or does not fall within the region corresponding to said predetermined pattern.

79. An apparatus for classifying picture elements as defined in claim 78 wherein said characteristic value $C_i$ is the maximum value of differences between the mean-level values ($Q_0$, $Q_{ij}$) corresponding to adjacent regions located along each of said lines $L_i$.

80. An apparatus for classifying picture elements as defined in claim 78 wherein said characteristic value $C_i$ is the maximum value of differences between said mean-level value $Q_0$ corresponding to said center region and the respective mean-level values $Q_{ij}$ corresponding to the peripheral regions located along each of said lines $L_i$.

81. An apparatus for classifying picture elements as defined in claim 78 wherein said radiation image of the object has been stored on a stimulable phosphor sheet.

82. An apparatus for classifying picture elements as defined in claim 81 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

83. An apparatus for classifying picture elements as defined in claim 82 wherein said stimulating rays are a laser beam.

84. An apparatus for classifying picture elements as defined in claim 78 wherein said radiation image of the object has been recorded on photographic film.

* * * * *